United States Patent
Dettinger et al.

(10) Patent No.: US 8,195,647 B2
(45) Date of Patent: Jun. 5, 2012

(54) ABSTRACT RECORDS

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/625,071

(22) Filed: Nov. 24, 2009

(65) Prior Publication Data
US 2010/0076961 A1    Mar. 25, 2010

Related U.S. Application Data

(63) Continuation of application No. 11/035,563, filed on Jan. 14, 2005, now Pat. No. 7,624,097.

(51) Int. Cl.
*G06F 17/30* (2006.01)

(52) U.S. Cl. ........ 707/716; 707/718; 707/760; 707/763; 707/769

(58) Field of Classification Search .................. 707/1, 3, 707/4, 102, 104.1, 713, 716, 718, 759, 760, 707/763, 769
See application file for complete search history.

(56) References Cited

U.S. PATENT DOCUMENTS

| | | | |
|---|---|---|---|
| 5,253,362 A | 10/1993 | Nolan et al. | |
| 5,345,586 A | 9/1994 | Hamala et al. | |
| 5,404,510 A | 4/1995 | Smith et al. | |
| 5,418,950 A | 5/1995 | Li et al. | |
| 5,471,611 A | 11/1995 | McGregor | |
| 5,515,488 A | 5/1996 | Hoppe et al. | |
| 5,584,024 A | 12/1996 | Shwartz | |
| 5,630,121 A | 5/1997 | Braden-Harder et al. | |
| 5,734,887 A | 3/1998 | Kingberg et al. | |
| 5,809,497 A | 9/1998 | Freund et al. | |
| 5,870,559 A | 2/1999 | Leshem et al. | |
| 5,918,232 A | 6/1999 | Pouschine et al. | |
| 5,958,008 A | 9/1999 | Pogrebisky et al. | |
| 5,999,933 A | 12/1999 | Mehta | |
| 6,003,034 A | 12/1999 | Tuli | |
| 6,009,422 A | 12/1999 | Ciccarelli | |
| 6,061,506 A | 5/2000 | Wollaston et al. | |
| 6,233,570 B1 | 5/2001 | Horvitz et al. | |
| 6,233,586 B1 | 5/2001 | Chang et al. | |
| 6,341,277 B1 | 1/2002 | Coden et al. | |
| 6,397,223 B1 | 5/2002 | Kori | |

(Continued)

OTHER PUBLICATIONS

Wen et al., Query Clustering in the Web Context, Information Retrieval and Clustering, W. Wu and H. Xiong (Eds.), pp. 1-30, 2002.

(Continued)

*Primary Examiner* — Tim T Vo
*Assistant Examiner* — Dangelino Gortayo
(74) *Attorney, Agent, or Firm* — Patterson & Sheridan LLP

(57) ABSTRACT

Embodiments of the invention provide methods, systems, and articles of manufacture improving the process of query composition, query processing, and presenting query results to users of an abstract database. Embodiments of the present invention organize and view data using abstract records. Specifically, users compose a query according to the logical relationships present in the data. Rather than evaluate conditions against a set of rows from a relational table, conditions included in abstract query are evaluated against instances of an abstract record. Instances that satisfy the conditions specified by an abstract query are returned as query results. In a specific case abstract records are used to evaluate a "never exists conditions, that determine the absence of data in an abstract records that satisfy a particular condition.

15 Claims, 14 Drawing Sheets

U.S. PATENT DOCUMENTS

| | | | |
|---|---|---|---|
| 6,408,291 | B1 | 6/2002 | Skeen et al. |
| 6,442,543 | B1 | 8/2002 | Snodgrass et al. |
| 6,457,009 | B1 | 9/2002 | Bollay |
| 6,460,043 | B1 | 10/2002 | Tabbara et al. |
| 6,484,162 | B1 | 11/2002 | Edlund et al. |
| 6,484,164 | B1 | 11/2002 | Nikolovska et al. |
| 6,499,026 | B1 | 12/2002 | Rivette et al. |
| 6,546,388 | B1 | 4/2003 | Edlund et al. |
| 6,553,368 | B2 | 4/2003 | Martin et al. |
| 6,578,027 | B2 | 6/2003 | Cambot et al. |
| 6,581,054 | B1 | 6/2003 | Bogrett |
| 6,601,065 | B1 | 7/2003 | Nelson et al. |
| 6,609,123 | B1 | 8/2003 | Cazemier et al. |
| 6,618,727 | B1 | 9/2003 | Wheeler et al. |
| 6,633,817 | B1 | 10/2003 | Walker et al. |
| 6,643,633 | B2 | 11/2003 | Chau et al. |
| 6,647,382 | B1 | 11/2003 | Saracco |
| 6,651,055 | B1 | 11/2003 | Kilmer et al. |
| 6,658,410 | B1 | 12/2003 | Sakamaki et al. |
| 6,711,563 | B1 | 3/2004 | Koskas et al. |
| 6,725,225 | B1 | 4/2004 | Kori |
| 6,725,227 | B1 | 4/2004 | Li |
| 6,745,178 | B1 | 6/2004 | Emens et al. |
| 6,772,150 | B1 | 8/2004 | Whitman et al. |
| 6,795,825 | B2 * | 9/2004 | Rishe ............... 707/999.003 |
| 6,803,927 | B1 | 10/2004 | Sahoo |
| 6,820,076 | B2 | 11/2004 | Bailey et al. |
| 6,928,431 | B2 | 8/2005 | Dettinger et al. |
| 6,954,748 | B2 | 10/2005 | Dettinger et al. |
| 6,978,324 | B1 | 12/2005 | Black |
| 6,985,912 | B2 | 1/2006 | Mullins et al. |
| 6,996,558 | B2 | 2/2006 | Dettinger et al. |
| 7,003,730 | B2 | 2/2006 | Dettinger et al. |
| 7,024,425 | B2 | 4/2006 | Krishnaprasad et al. |
| 7,054,877 | B2 | 5/2006 | Dettinger et al. |
| 7,096,217 | B2 | 8/2006 | Dettinger et al. |
| 7,096,229 | B2 | 8/2006 | Dettinger et al. |
| 7,139,766 | B2 * | 11/2006 | Thomson et al. ...... 707/999.101 |
| 7,139,774 | B2 | 11/2006 | Dettinger et al. |
| 7,146,376 | B2 | 12/2006 | Dettinger et al. |
| 7,213,017 | B2 | 5/2007 | Rys et al. |
| 7,249,118 | B2 | 7/2007 | Sandler et al. |
| 7,263,517 | B2 * | 8/2007 | Sheu et al. ............ 707/999.003 |
| 7,321,895 | B2 | 1/2008 | Dettinger et al. |
| 7,333,981 | B2 | 2/2008 | Dettinger et al. |
| 7,343,365 | B2 | 3/2008 | Farnham et al. |
| 7,363,287 | B2 | 4/2008 | Kilmer et al. |
| 7,383,255 | B2 | 6/2008 | Desai et al. |
| 7,461,052 | B2 | 12/2008 | Dettinger et al. |
| 7,480,648 | B2 | 1/2009 | Adams et al. |
| 7,519,577 | B2 * | 4/2009 | Brundage et al. ...... 707/999.003 |
| 7,539,662 | B2 | 5/2009 | Dettinger et al. |
| 7,555,497 | B2 * | 6/2009 | Thompson et al. .... 707/999.103 |
| 7,624,097 | B2 | 11/2009 | Dettinger et al. |
| 7,668,806 | B2 * | 2/2010 | Liu et al. ............... 707/999.003 |
| 7,743,019 | B2 * | 6/2010 | Shah et al. .................... 707/610 |
| 7,818,347 | B2 | 10/2010 | Dettinger et al. |
| 7,818,348 | B2 | 10/2010 | Dettinger et al. |
| 2001/0047270 | A1 | 11/2001 | Gusick et al. |
| 2002/0026630 | A1 | 2/2002 | Schmidt et al. |
| 2002/0046281 | A1 | 4/2002 | Cope |
| 2002/0078045 | A1 | 6/2002 | Dutta |
| 2002/0078068 | A1 | 6/2002 | Krishnaprasad et al. |
| 2002/0091702 | A1 | 7/2002 | Mullins |
| 2002/0091990 | A1 | 7/2002 | Little et al. |
| 2003/0014399 | A1 | 1/2003 | Hansen et al. |
| 2003/0046385 | A1 | 3/2003 | Vincent |
| 2003/0046390 | A1 | 3/2003 | Ball et al. |
| 2003/0061209 | A1 | 3/2003 | Raboczi et al. |
| 2003/0061215 | A1 | 3/2003 | Messina |
| 2003/0144994 | A1 | 7/2003 | Wen et al. |
| 2003/0163455 | A1 | 8/2003 | Dettinger et al. |
| 2003/0167274 | A1 | 9/2003 | Dettinger et al. |
| 2003/0169284 | A1 | 9/2003 | Dettinger et al. |
| 2003/0172056 | A1 * | 9/2003 | Dettinger et al. ................. 707/3 |
| 2003/0214525 | A1 | 11/2003 | Esfahany |
| 2003/0217033 | A1 | 11/2003 | Sandler et al. |
| 2003/0220893 | A1 | 11/2003 | Dettinger et al. |
| 2004/0039736 | A1 | 2/2004 | Kilmer et al. |
| 2004/0039820 | A1 | 2/2004 | Colby et al. |
| 2004/0048233 | A1 | 3/2004 | Matthews et al. |
| 2004/0059746 | A1 | 3/2004 | Error et al. |
| 2004/0148278 | A1 | 7/2004 | Milo et al. |
| 2004/0158567 | A1 | 8/2004 | Dettinger et al. |
| 2004/0260685 | A1 | 12/2004 | Pfleiger et al. |
| 2004/0260691 | A1 | 12/2004 | Desai et al. |
| 2004/0267760 | A1 | 12/2004 | Brundage et al. |
| 2005/0004911 | A1 | 1/2005 | Goldberg et al. |
| 2005/0076015 | A1 | 4/2005 | Dettinger et al. |
| 2005/0193114 | A1 | 9/2005 | Colby et al. |
| 2005/0267760 | A1 | 12/2005 | Meyer et al. |
| 2006/0010127 | A1 | 1/2006 | Dettinger et al. |
| 2006/0047638 | A1 | 3/2006 | Dettinger et al. |
| 2006/0053142 | A1 | 3/2006 | Sebbane |
| 2006/0095457 | A1 | 5/2006 | Glasspool et al. |
| 2006/0122993 | A1 | 6/2006 | Dettinger et al. |
| 2006/0136382 | A1 | 6/2006 | Dettinger et al. |
| 2006/0136469 | A1 | 6/2006 | Dettinger et al. |
| 2006/0136470 | A1 | 6/2006 | Dettinger et al. |
| 2006/0155692 | A1 | 7/2006 | Dettinger et al. |
| 2006/0161521 | A1 | 7/2006 | Dettinger et al. |
| 2006/0212418 | A1 | 9/2006 | Dettinger et al. |
| 2008/0091668 | A1 | 4/2008 | Dettinger et al. |
| 2009/0182708 | A1 | 7/2009 | Dettinger et al. |

OTHER PUBLICATIONS

Wen et al., Query Clustering Using User Logs, ACM Transactions of Information Systems, vol. 20, No. 1, Jan. 2002, pp. 59-81.

Raghavan et al., On the Reuse of Past Optimal Queries, SIGIR'95, Seattle, WA, 1995, pp. 344-350.

Wen et al., Clustering User Queries of a Search Engine, WWW'10, May 1-5, 2001, Hong Kong, pp. 162-168.

Braunmueller et al., Multiple Similarity Queries: A Basic DBMS Operation for Mining in Metric Databases, IEEE Transactions on Knowledge and Data Engineering, vol. 13, No. 1, Jan./Feb. 2001, pp. 79-95.

Office Action History of parent U.S. Appl. No. 11/035,563.

Office Action History of U.S. Appl. No. 10/083,075.

Office Action History of U.S. Appl. No. 10/403,356.

Office Action History of U.S. Appl. No. 11/005,435.

Batory et al., "Implementing a Domain Model for Data Structures[1,2]," *International Journal of Software Engineering and Knowledge Engineering*, Sep. 1992, vol. 2(3): pp. 375-402.

Franconi et al., "A Data Warehouse Conceptual Data Model for Multidimensional Aggregation," *Proceedings of the International Workshop on Design and Management of Data Warehouses (DMDW '99)*, 1999: pp. 13-1-13-10.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering*, Apr. 1995, vol. 7(2): pp. 228-245.

Office Action History for U.S. Appl. No. 10/083,075 from Nov. 26, 2004 to Sep. 1, 2005.

Office Action History for U.S. Appl. No. 11/226,181 from Mar. 25, 2009 to Aug. 10, 2010.

Office Action History for U.S. Appl. No. 10/403,356 from Sep. 20, 2005 to Jan. 12, 2006.

Office Action History for U.S. Appl. No. 11/360,353 from Feb. 21, 2008 to Jan. 21, 2009.

Office Action History for U.S. Appl. No. 11/005,418 from Mar. 12, 2007 to Aug. 4, 2008.

Office Action History for U.S. Appl. No. 11/953,935 from Jan. 5, 2010 to Sep. 29, 2010.

Office Action History for U.S. Appl. No. 11/035,710 from Apr. 19, 2007 to Nov. 6, 2007.

Office Action History for U.S. Appl. No. 11/951,675 from Jan. 25, 2010 to Jun. 11, 2010.

Office Action History for U.S. Appl. No. 12/018,132 from Mar. 2, 2010 to Jun. 10, 2010.

Office Action History for U.S. Appl. No. 11/035,563 from Apr. 1, 2009 to Jul. 9, 2009.
Office Action History for U.S. Appl. No. 11/083,208 from Nov. 27, 2007 to Sep. 10, 2010.
Calmet et al., A Generic Query-Translation Framework for a Mediator Architecture, Proceedings of the Thirteenth International Conference on Data Engineering (ICDE '97), pp. 434-443, 1997, IEEE Computer Society Washington, DC, USA.

J. M. Sagawa, "Repository Manager Technology", IBM Systems Journal, 1990, vol. 29, Issue: 2, pp. 209-227.
Panos Vassiliadis, Alkis Simitsis and Spiros Skiadopoulos, "Conceptual Modeling for ETL Processes", Proceedings of DOLAP '02 (the 5th ACM International Workshop on Data Warehousing and OLAP), Nov. 8, 2002, McLean, Virginia, USA, pp. 14-21.

* cited by examiner

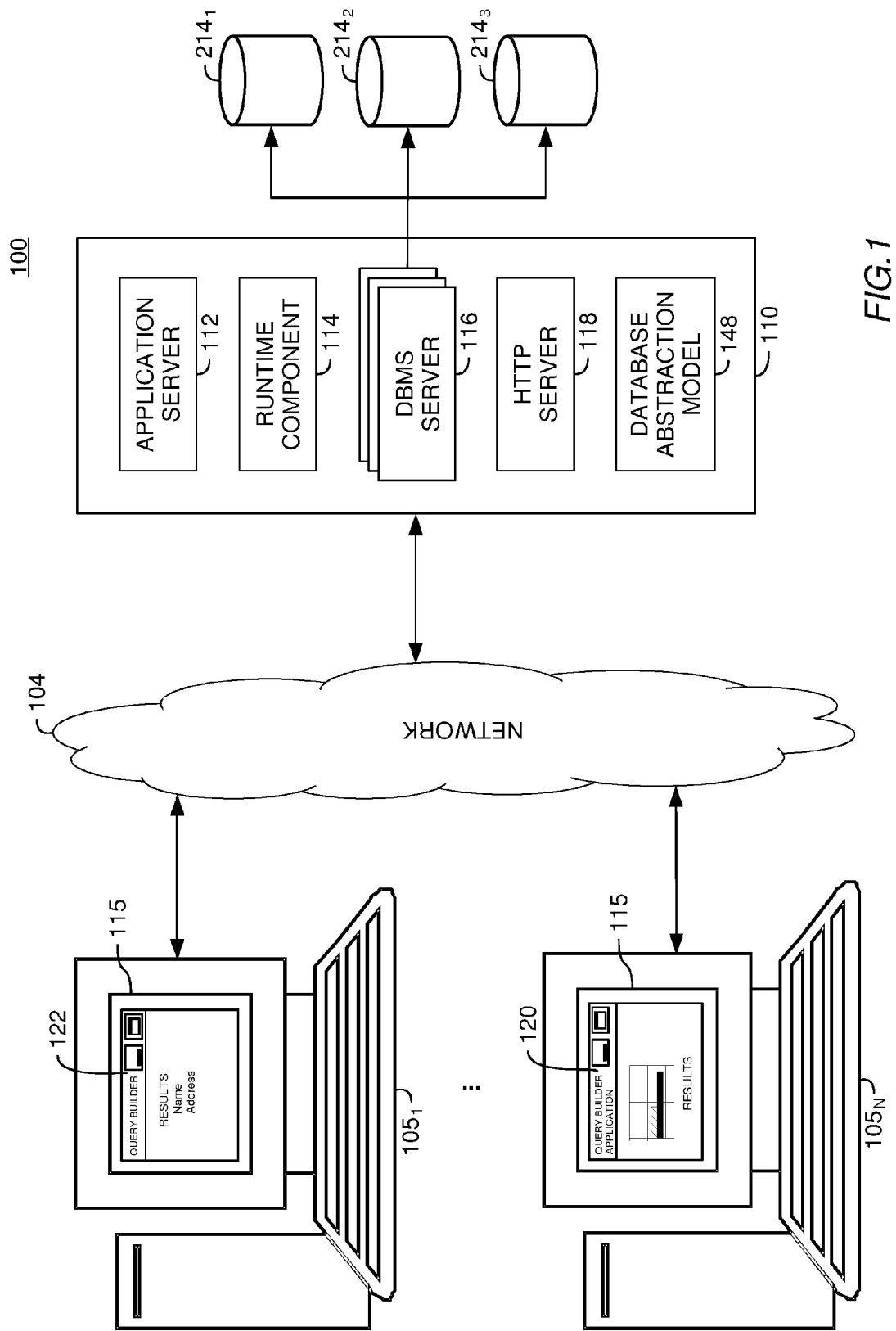

*700*

*120, 122*

QUERY APPLICATION

FILE   EDIT   VIEW

ABSTRACT QUERY
    FIND PATIENTS WITH A GLUCOSE VALUE OF TWENTY
    SELECT NAME, ID, TEST VALUE, TEST DATE

[EXECUTE] [MODIFY] [OK]

*202*

| RECORDS | ABSTRACT RECORD FOR BOB JONES |
|---|---|
| ▶ BOB JONES<br>   GLUCOSE TESTS :<br>   11/4, 20<br>▶ HILL, DAVID<br>▶ READ, RANDOL<br>   ⋮ | NAME : BOB JONES<br>PATIENT ID = 123<br>   GLUCOSE TEST |

*FIG. 7*

ABSTRACT RECORDS

CROSS-REFERENCE TO RELATED APPLICATIONS

This application is a continuation of co-pending U.S. patent application Ser. No. 11/035,563, filed Jan. 14, 2005, which is herein incorporated by reference in its entirety.

BACKGROUND OF THE INVENTION

1. Field of the Invention

The present invention is related to computer databases. More specifically, the present invention is related to methods of organizing data stored in a computer database and related to query processing techniques.

2. Description of the Related Art

Databases are well known systems for information storage and retrieval. The most prevalent type of database in use today is the relational database, a tabular database in which data is defined so that it can be reorganized and accessed in a number of different ways. A relational database management system (DBMS) uses relational techniques for storing and retrieving data.

Structured Query Language (SQL) is a well known database language that that includes commands for retrieving, storing, updating, and deleting data stored in a relational database. An SQL query is constructed as a text string that must strictly conform to the grammar requirements of the SQL query language. Further, an SQL query must be semantically correct to perform as desired by the user. That is, many syntactically correct SQL statements may fail to perform as desired due to semantic errors. Because of this complexity, database query applications are often used to assist a user in composing an SQL query of a relational database.

For example, one technique for managing the complexity of a relational database and the SQL query language is to use database abstraction techniques. Commonly assigned U.S. patent application Ser. No. 10/083,075 (the '075 application) entitled "Application Portability and Extensibility through Database Schema and Query Abstraction", discloses a framework that provides an abstract view of a physical data storage mechanism. The framework of the '075 application provides a requesting entity (i.e., an end-user or front-end application) with an abstract representation of data stored in an underlying physical storage mechanism, such as a relational database.

Using the database abstraction model, logical fields are defined that describe the data stored in an underlying database. Users compose abstract queries by selecting logical fields and specifying conditions. Each logical field includes an access method that specifies how to retrieve data from an underlying database system corresponding to the logical field. The system then retrieves data from the underlying database by executing a resolved query generated from the abstract query.

Commonly assigned, U.S. patent application entitled "Abstract Query Plan" discloses techniques for processing an abstract query that include generating an intermediate representation of an abstract query which is then used to generate the resolved query. The intermediate representation may include a combination of elements taken from the database abstraction model and from the physical representation. To generate the intermediate representation while processing an abstract query, the database abstraction model must identify which data sources (e.g., tables) from the underlying database to include in the intermediate representation. In addition, the database abstraction model must identify how many copies of each data source are required. For example, an abstract query may specify that multiple conditions should be applied to data from the same relational table. Separate copies of the table allow the system to process each condition independently.

Once created, the database abstraction model provides a powerful interface that allows users to compose an abstract query consistent with the intuitive logical relationships about data being queried, regardless of the type or complexity of the underlying database storage mechanism. Users compose queries of the abstraction, rather than of the underlying database. Ultimately, however, the abstract query must be translated/resolved into a query of the underlying database (e.g., an SQL query). Thus, the database abstraction model must be able to interpret the conditions specified by the query and create a resolved query that includes the conditions.

Further, relational databases represent data using rows and columns. Accordingly, an SQL query retrieves a row set (i.e., a table) of values that satisfy conditions specified by the query. Oftentimes, a row set is simply displayed to a user as an unformatted table. One problem with this approach is that data in different columns of the row set are treated equally. That is, a row set fails to capture the one-to-one and one-to-many relationships logically present in the data. For example, consider a row set of medical test results for a given patient. Each row of the row set duplicates data elements, such as, the name, gender, and patient ID for each row that includes a single test result. The following table illustrates this effect of row-based query results.

TABLE I

Row Based Query Results

| Patient ID | Last Name | Current Age | Test Results |
|---|---|---|---|
| 1 | Smith | 27 | 23 |
| 1 | Smith | 27 | 28 |
| 1 | Smith | 27 | 21 |
| 2 | Jones | 18 | 33 |
| 2 | Jones | 18 | 35 |

More generally, a row set represents query results as the data is stored in a relational database, and not as a set of interwoven facts and relationships that data represents to a user of the database. Such relationships are presented by the database abstraction model at the "front-end", when an abstract query is composed from logical fields, but not at the "back-end," when query results are presented as a row-set of data represented as a table. Users however, understand these relationships and intuitively rely on them while interacting with the database environment.

Accordingly, there is a need for improved techniques for generating a query of an underlying physical storage mechanism, such as an SQL query of a relational database, from an abstract query. Abstract query processing techniques should identify the underlying data sources (e.g., tables) that include data needed to evaluate conditions specified in the abstract query. Further, query results should be presented in a manner consistent with users' logical view of the data being queried.

SUMMARY OF THE INVENTION

Embodiments of the invention provide methods, systems, and articles of manufacture improving query composition, query processing, and presenting query results to users of an abstract database. Embodiments of the present invention organize and view data using abstract records. Specifically, users compose a query according to the logical relationships present in the data. Rather than evaluate conditions against a set of rows from a relational table, conditions included in abstract query are evaluated against instances of an abstract record. Instances that satisfy the conditions specified by an abstract query are returned as query results. In a particular embodiment, abstract records are used to evaluate a "never exist" condition. A "never exist condition specified to determine the absence of data in an abstract record.

One embodiment of the invention provides a method for processing an abstract query. The method generally includes providing a database abstraction model specifying (i) a plurality of logical fields, wherein each logical field provides an access method that maps the logical field to data associated with the logical field, and (ii) a plurality of model entities, wherein each model entity specifies an identifier in an underlying database used to identify instances of the model entity, receiving, from a requesting entity, an abstract query specifying (i) one of the plurality of model entities, (ii) a set of conditions, wherein each condition includes a logical field, a conditional operator, and a comparison value, and (iii) logical fields from the plurality of logical fields used to retrieve a set of query results that satisfy the set of conditions, and retrieving an abstract record corresponding to the model entity specified by the abstract query, wherein the abstract record identifies a hierarchy of logical fields, from the plurality of logical fields, related to the model entity. The method generally further includes determining, for each condition specified by the abstract query, whether a path exists from a root logical field of the hierarchy to a child logical field of the hierarchy matching the logical field in the condition, and for each path determined to exist, associating a table of the underlying database that is mapped to by the child logical field with a table instance, each table instance including those logical fields from the abstract query that map to the table, those conditions from the set of conditions to be evaluated using data from the table, and generating an abstract query plan that includes the table instances and identifies relationships between the table instances.

Another embodiment of the invention provides a method of presenting a user with a set of query results retrieved from a database. The method generally includes receiving, from a requesting entity, a request to view data in the database related to a model entity predefined as a set of logically related data fields, wherein the model entity identifies an identifier in the underlying database used to identify instances of the model entity, and retrieving an abstract record corresponding to the model entity, wherein the abstract record identifies a hierarchy of logical fields related to the model entity. The method generally further includes, identifying each instance of the model entity included in the query results, and for each identified instance, populating a copy of the abstract record with the retrieved query results corresponding to the instance of the model entity. The method generally further includes returning, to the requesting entity, the identified instances of the model entity and the copy of the abstract record.

Another embodiment of the invention provides a computer-readable medium that contains a plurality of instructions which, when executed on a computer system, is configured to perform operations. The operations generally include providing a database abstraction model specifies (i) a plurality of logical fields, wherein each logical field provides an access method that maps the logical field to data associated with the logical field, and (ii) a plurality of model entities, wherein each model entity specifies an identifier in an underlying database used to identify instances of the model entity and relationships between tables in the database, receiving, from a requesting entity, an abstract query specifying (i) one of the plurality of model entities, (ii) a set of conditions, wherein each condition includes a logical field, a conditional operator, and a comparison value, and (iii) logical fields from the plurality of logical fields used to retrieve a set of query results that satisfy the set of conditions. The operations generally further include retrieving an abstract record corresponding to the model entity specified by the abstract query, wherein the abstract record identifies a hierarchy of logical fields, from the plurality of logical fields, related to the model entity, and determining, for each condition specified by the abstract query, whether a path exists from a root logical field of the hierarchy to a child logical field of the hierarchy matching the logical field in the condition. The operations generally further include, for each path determined to exist, associating a table of the underlying database that is mapped to by the child logical field with a table instance, each table instance including those logical fields from the abstract query that map to the table, those conditions from the set of conditions to be evaluated using data from the table, and generating an abstract query plan that includes the table instances and identifies relationships between the table instances.

Another embodiment of the invention provides a computer-readable medium that contains a plurality of instructions which, when executed on a computer system, is configured to perform operations. The operations generally include receiving, from a requesting entity, a request to view data in the database related to a model entity predefined as a set of logically related data fields, wherein the model entity identifies an identifier in the underlying database used to identify instances of the model entity, and retrieving an abstract record corresponding to the model entity, wherein the abstract record identifies a hierarchy of logical fields related to the model entity. The operations generally further include identifying each instance of the model entity included in the query results; and for each instance, populating a copy of the abstract record with the retrieved query results corresponding to the instance of the model entity, and returning the populated copies and identified instances of the model entity to the requesting entity.

Another embodiment provides a system for processing an abstract query. The system generally includes a database and a database abstraction model specifying (i) a plurality of logical fields, wherein each logical field provides an access method that maps to data associated with the logical field, and (ii) a plurality of model entities, wherein each model entity specifies an identifier in an underlying database used to identify instances of the model entity. The system generally further includes a runtime component configured to receive, from a requesting entity, an abstract query specifying (i) one of the plurality of model entities, (ii) a set of conditions, wherein each condition includes a logical field, a conditional operator, and a comparison value, and (iii) logical fields from the plurality of logical fields used to retrieve a set of query results that satisfy the set of conditions. The runtime component, in response to receiving the abstract query, is generally further configured to (a) retrieve an abstract record corresponding to the model entity specified by the abstract query, wherein the abstract record identifies a hierarchy of logical fields, from the plurality of logical fields, related to the model entity, (b) determine, for each condition specified by the abstract query, whether a path exists from a root logical field of the hierarchy to a child logical field of the hierarchy matching the logical field in the condition, (c) and for each path determined to exist, to associate a table of the underlying database that is mapped to by the child logical field with a table instance, each table instance including those logical fields from the abstract query that map to the table, and those conditions from the set of conditions to be evaluated using data from the table, and (d) generate an abstract query plan that includes the table instances and identifies relationships between the table instances.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

The appended drawings, however, are provided to illustrate typical embodiments of the invention and, therefore, should not be considered limiting of its scope, for the invention may admit to other equally effective embodiments.

FIG. 1 illustrates a relational view of software and hardware components, according to one embodiment of the invention.

FIG. 7 illustrates an exemplary graphical user interface screen that presents users with instances of an abstract record, according to one embodiment of the invention.

DETAILED DESCRIPTION OF THE PREFERRED EMBODIMENTS

Figure 2A:
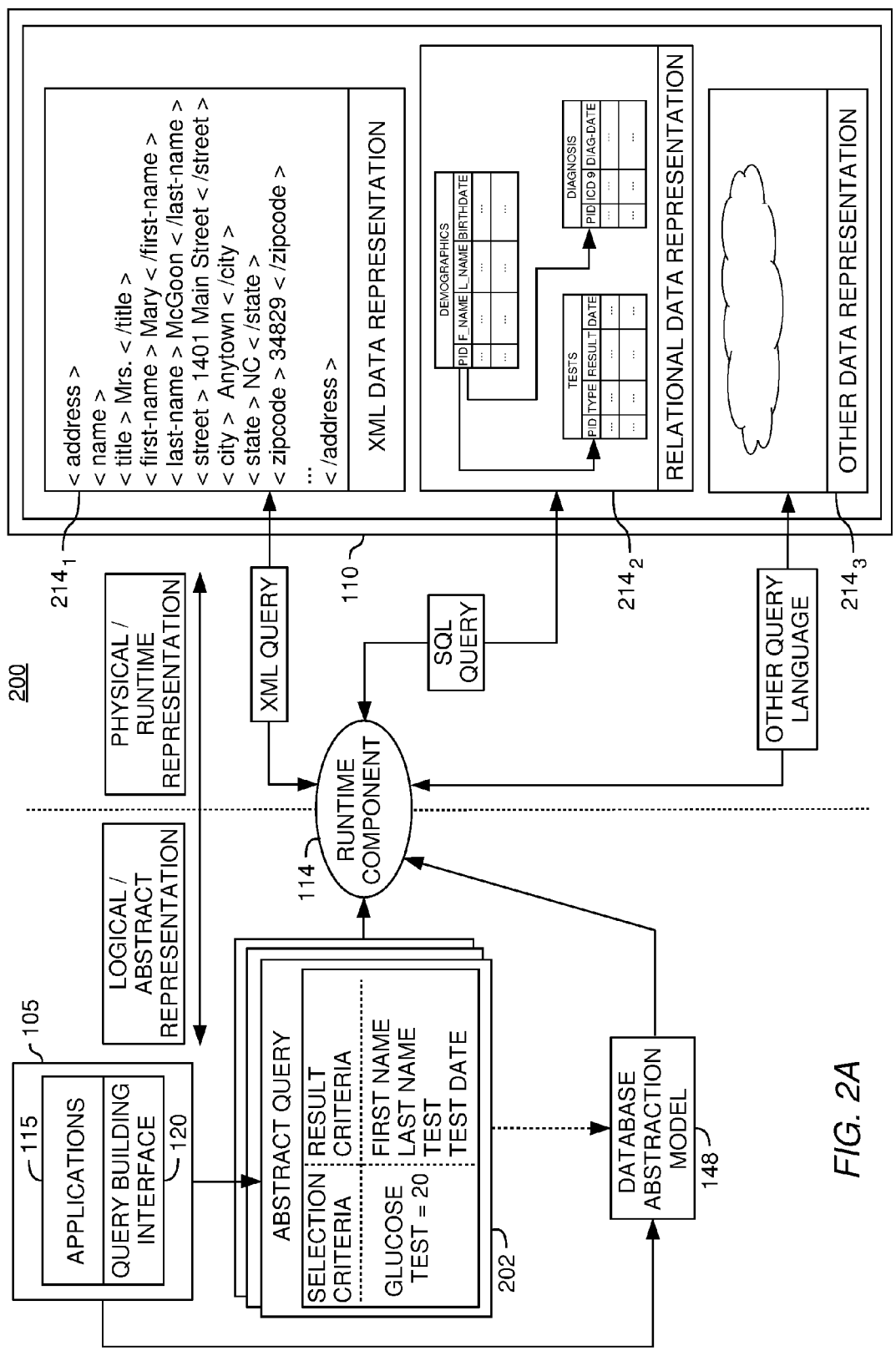
FIG. 2A illustrates a logical and physical representation of the database abstraction model environment, according to one embodiment of the invention.

Embodiments of the present invention provide methods for organizing and viewing data using abstract records. Abstract records provide a logical representation of data stored in an underlying physical database. Abstract records organize data from the perspective of a model entity, and each model entity may be used as the foundation for an abstract record. In one embodiment, a model entity provides the logical focus of an abstract query. In the database abstraction model, a model entity is defined in reference to an identifier in the underlying database. Instances of the model entity (the abstract view) correspond to instances of the indenter (the physical view). Example model entities include "patients" and "employees" identified using a Patient ID or Employee ID value in the underlying database. Once an abstract query is composed, the system uses an abstract record to interpret the conditions specified by the abstract query as part of generating an intermediate representation of the query. The intermediate representation may be used to generate a resolved query of the underlying database covered by the database abstraction model. Further, instances of an abstract record may be used to present query results to a user interacting with the database abstraction model.

Generally, abstract records identify what kinds of data about the model entity may exist in the underlying physical database, as well was what data sources will contain the data. In one embodiment, an abstract record stores the model entity as the root of a hierarchical data structure. Descending from the root of the hierarchy are all of the facts about the model entity stored in the database. Each node of the abstract record hierarchy identifies data associated with the model entity, and may also be used as a container of data for an instance of the model entity. Nodes of the abstract record hierarchy are connected according to one-to-one and one-to-many relationships present in the data stored in an underlying database. Thus, the abstract record may be used to avoid the duplication of the "one" items of data that occur when representing one-to-many query results as a row set.

Moreover, rather than query relational database tables, embodiments of the invention allow a user to simply ask a question about the model entity. For example, consider a relational database storing test results for patients that satisfy any conditions specified in the query. To the database, data is a set of rows stored in tables; however, to a user, a query is posed to learn about patients. In response to an abstract query, the system determines whether the model entity ("patients" in this example) can answer the question posed by the abstract query, and if so, returns instances of the patient model entity. In this example, each instance of the abstract record represents a patient and may be used to describe actual data in the underlying physical database related to that patient. The conditions specified in the abstract query are evaluated against instances of the abstract record. A user may then traverse through each instance of the abstract record returned in response to a given abstract query and view actual data values related to that particular instance. Because query conditions are evaluated against instances of the abstract record, only the instances that satisfy the query conditions are returned.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Similarly, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii)

alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

The following description first describes the database abstraction model environment. Within this environment, abstract records are then described as an extension to the database abstraction model. Next described are methods for abstract query processing that include abstract records, and methods for presenting query results to a user by returning instances of an abstract record are also described.

The Database Abstraction Model: Physical View of the Environment

FIG. 1 illustrates a networked computer system in a client-server configuration. Client computer systems $105_{1-N}$ include a network interface allowing them to communicate with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX® and OS/4000 FreeBSD, and the like) that manages the interaction between hardware components and higher-level software applications running on client system 105.

In one embodiment, a user establishes a network connection between client system 105 and server system 110. Such a connection may include a login process that includes a user authenticating their identity to the server system 110. For example, a username and password scheme may be used, or an authentication scheme using digital certificates or biometric authentication may be used. Systems that do not require authentication are also contemplated. The server system 110 may include computer hardware components similar to those used by client system 105. Accordingly, the server system 110 generally includes a CPU, a memory, and a storage device connected to a bus (not shown). The server system 110 is also running an operating system, (e.g., a Linux® distribution, Microsoft Windows®, IBM's AIX® or OS/400®, FreeBSD, and the like) that manages the interaction between hardware components and software applications.

The computer systems illustrated in FIG. 1, however, are merely exemplary of one hardware/software configuration. Embodiments of the present invention may be implemented using other configurations, regardless of whether the computer systems are complex, multi-user computing systems, such as a cluster of individual computers connected by a high-speed network, single-user workstations, or network appliances lacking non-volatile storage of their own. Additionally, although described herein using a client/server network configuration, embodiments employing distributed computing or peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) adapted to respond to HTTP requests from the client system 105 and to transmit HTML documents to client system 105. The web-pages themselves may be static documents stored on server system 110 or generated dynamically using application server 112 interacting with web-server 118 to service HTTP. The web-pages may include pages that present a query-building interface 115 to a user interacting with the system 110.

Alternatively, or in addition, client application 120 may provide a database front-end, or query application program running on client system $105_N$. In either case, the query building interface 115 allows users to compose an abstract query using entities defined by database abstraction model 148. The database abstraction model 148 defines the logical fields available for query composition. Once composed, the abstract query is submitted to the runtime component 114, which generates a resolved query of the databases underlying the abstraction (e.g., databases 214).

As illustrated in FIG. 1, server system 110 may further include runtime component 114 and DBMS servers 116. These components may each comprise a software program executing on the server system 110. DBMS servers 116 generally comprise software applications configured to manage databases $214_{1-3}$. By way of illustration, the individual databases accessible through DBMS servers 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116. Further, databases 214 may exist on the local storage system of server system 110, or may be accessed over network 104.

In one embodiment, a user composes an abstract query by specifying a model entity being queried, a selection of logical fields, and conditions applied against the fields. The database abstraction model 148 defines each logical field along with the relationships between logical fields and data from an underlying physical database. In one embodiment, each logical field defined by the database abstraction model 148 includes a name and an access method. The access method identifies the underlying database (e.g., databases $214_{1-3}$)

where the data is located, as well as the method to access the data in the underlying physical storage mechanism.

Runtime component 114 may be configured to generate a query consistent with the physical representation of the data contained in one or more of the databases 214. In other words, the runtime component is the "transformational engine" used to generate a resolved query (e.g., an SQL statement) from an abstract query. The runtime component 114 generates a physical query issued against the underlying physical storage mechanism. In one embodiment, the runtime component 114 generates an intermediate representation of the abstract query, such as an abstract query plan, and uses the intermediate representation to generate a resolved query. Detailed examples of abstract query plans are described in commonly assigned, co-pending, U.S. patent application "Abstract Query Plan," Ser. No. 11/005,435, filed on Dec. 6, 2004, incorporated by reference in its entirety. Additionally, the runtime component 114 may be configured to return query results to the requesting entity as a set of instances of an abstract record.

FIG. 2A illustrates a plurality of related elements of the invention, along with the transformation between the abstract view provided by the database abstraction model 148 (the left side of FIG. 2A), and the underlying database mechanism 214 used to store data (the right side of FIG. 2A). In one embodiment, a requesting entity composes an abstract query 202 using query building interface 115. The query building interface 115 may be provided by the application 120, or may be a web-page rendered on web browser 122. The resulting query is generally referred to herein as an "abstract query" because it is composed from logical fields rather than by direct references to data entities in underlying databases $214_{1-3}$. As a result, abstract queries may be composed independently from a particular underlying database schema.

In one embodiment, the logical fields used to compose the abstract query 202 are defined by the database abstraction model 148. In general, the database abstraction model 148 provides an abstract representation of the underlying database. The runtime component 114 is the bridge between the abstract representation provided by the database abstraction model 148 and the underlying physical database. For example, the runtime component 114 may transform abstract query 202 into an XML query that queries data from database $214_1$, an SQL query of relational database $214_2$, or other query composed according to another physical storage mechanism (whether currently known or later developed).

The Database Abstraction Model: Logical View of the Environment

Figure 2B:
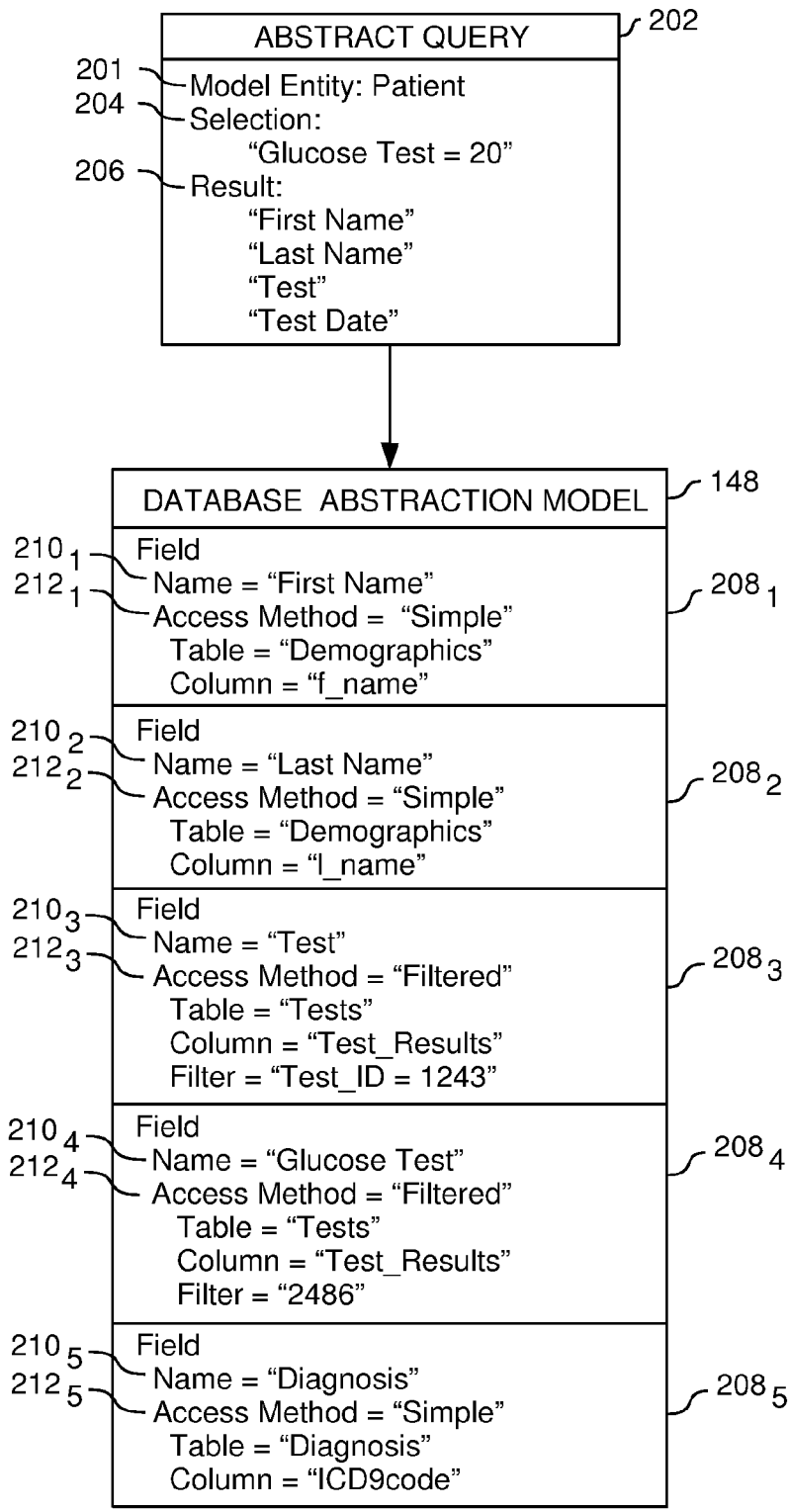
FIG. 2B illustrates an exemplary abstract query and corresponding database abstraction model, according to one embodiment of the invention.

FIG. 2B illustrates an exemplary abstract query 202. The query includes selection criteria 204 designed to retrieve instances of the patient model entity 201 that satisfy the specified condition of "glucose=20". Results criteria 206 specify the information retrieved for the abstract query 202. In this case, abstract query 202 retrieves name, age, and test results for a glucose test of patients that satisfy the condition 204. Selection condition 204 indicates the selection criteria of "glucose=20." The actual data retrieved may include data from multiple tests. That is, the query results may exhibit a one-to-many relationship between each patient and the test results for the patient.

Abstract query 202 specifies a model entity 201; as illustrated, a "patient" model entity. Model entities provide the runtime component 114 with the focus or perspective for a particular abstract query. In other words, the model entity serves to identify broad categories of data, such as a "patient" data. Further, the "patient" model entity specified by abstract query 202 may be used as the root of an abstract record that identifies all of the facts and data about the model entity that may be queried. For example, the "patient" abstract record includes an indication of what patient-related information is stored in an underlying physical database.

In one embodiment, a user specifies what model entity is being queried as part of the query building process. Model entities may be defined by the database abstraction model 148. Using an appropriate application (e.g., application 120), a user can select any of the available model entities defined by the database abstraction model 148. As described below, the runtime component 114 may use the model entity selected for an abstract query to select a root node when constructing an abstract query plan. Detailed examples of model entities are described in further detail in a commonly owned, pending application entitled "Dealing with Composite Data through Data Model Entities," application Ser. No. 10/403,356 filed on Mar. 31, 2003, which is incorporated by reference herein in its entirety.

FIG. 2B illustrates one embodiment of a database abstraction model 148 that provides a plurality of logical field specifications $208_{1-5}$ (five shown by way of example). Collectively, logical field specifications 208 create an abstraction layer over the set of underlying physical database tables illustrated as part of database $214_2$ in FIG. 2A.

The logical fields shown in FIG. 2B illustrate an abstraction layer constructed over a relational database (e.g., database $214_2$). That is, the access methods provided by field specifications 208 define a mapping between the logical field and the tables and columns of database $214_2$. The database abstraction model 148 provides a logical field specification 208 for each logical field available for composition of an abstract query (e.g., abstract query 202). The logical field specification 208 stores a definition for each logical field, and any associated metadata. As illustrated, each field specification 208 identifies a logical field name $210_{1-5}$ and an associated access method $212_{1-5}$. The runtime component 114 uses the access method to map each logical field to a particular physical data storage mechanism 214. Depending upon the number of different types of logical fields, any number of access methods is contemplated. As illustrated in FIG. 2B, access methods for simple fields, filtered fields, and composed fields are provided.

Field specifications $208_1$, $208_2$, and $208_5$, each provide a simple access method $212_1$, $212_2$ and $212_5$. Simple access methods provide a direct mapping to a particular table and column in the underlying physical data representation. For example, the simple field access method $212_1$ shown in FIG. 2B maps the logical field name $210_1$ "FirstName) to a column named "f_name" in a table named "Demographics."

Field specification $208_4$ exemplifies a filtered field access method $212_4$. Filtered access methods identify an associated physical entity and provide rules used to define a specific subset of items within the physical data representation. Consider, for example, a relational table storing test results for a plurality of different medical tests. Logical fields corresponding to each different test may be defined, and the filter for each different test is used to identify the particular test associated with each individual logical field. FIG. 2B provides an example in which the access method for filtered field $212_4$ maps the logical field name $210_4$ ("Glucose Test") to a physical entity in a column named "Test_Result" in a table named "Tests" and defines a filter "Test_ID='1243.' Filtered fields act as selection criteria used to restrict items from a larger set of data, without the user having to know the specifics of how the data is represented in the underlying database or having to specify the selection criteria as part of the query building process. Similarly, filtered field $208_3$ maps to the test table using a filter that limits query results retrieved for logical field 208₃ to test results for a hemoglobin test.

Another type of access method provides a composed access method (not shown). Composed access methods generate values from one or more physical data items, or data returned by other logical fields, using an expression supplied as part of the access method definition. In this way, information that does not directly exist in the underlying data representation may be computed and provided to a requesting entity. For example, an "age" logical field could be composed that computes an age of a patient using a birthdate retrieved from the database and an expression that calculates current age using the birthdate and a current date. Another example includes a "name" logical field composed from a "first name" and "last name" logical field concatenated together.

By way of example, the field specifications 208 of the data repository abstraction component 148 shown in FIG. 2B are representative of logical fields mapped to data represented in the relational data representation 214₂. However, other instances of the data repository abstraction component 148 or other logical field specifications may map to other physical data representations (e.g., databases 214₁ or 214₃ illustrated in FIG. 2A).

An illustrative abstract query corresponding to abstract query 202 is shown in Table I below. In this example, the abstract query 202 is represented using XML. In one embodiment, application 120 or 122 may be configured to generate an XML document to represent an abstract query composed by a user interacting with the query building interface 115. Those skilled in the art will recognize that XML is a well known language used to facilitate the sharing of structured text and information, other languages, however, may be used.

database used to identify instances of the model entity. In this case, instances of the "patients" model entity are identified using values from the "Patient ID" column of the Demographics table.

Abstract Records: Evaluating Query Conditions

After an abstract query is composed, it is submitted to the runtime component 114 for processing. Ultimately, the abstract query is used to generate a resolved query of the underlying database. In one embodiment, this process occurs in multiple steps that include generating an intermediate representation of the query, such as an abstract query plan.

Figure 3A:
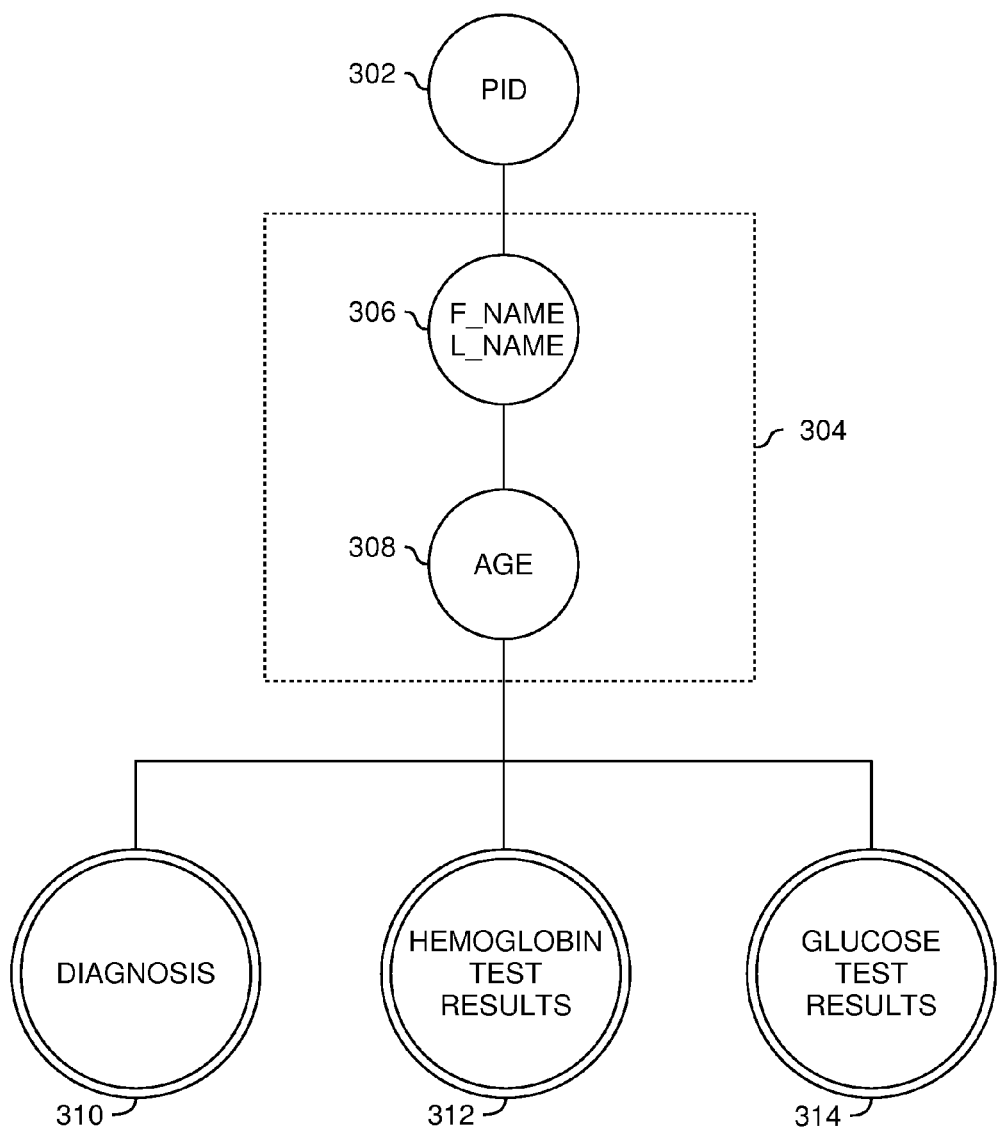
FIGS. 3A-3C illustrate exemplary abstract records, according to one embodiment of the invention.

FIG. 3A illustrates a graphical representation of an abstract record 300 corresponding to the "patients" model entity. In one embodiment, the database abstraction model 148 may provide a template abstract record for each model entity. Abstract record 300 illustrates a template for the "patient" model entity. Abstract record 300 includes root node 302 that identifies the model entity field for the abstract record. Each node of the abstract record 300 identifies logical fields available in the database abstraction model 148 that are related to the node. As illustrated, the "patient ID" logical field is used as the root for the "patients" model entity. Descending from the node 302 are "child" logical fields. In this example, these nodes include node 306 (that includes the "f_name" and "l_name" logical fields, and node 308 (that includes the "age" logical field). Nodes 306 and 308 are grouped in box 304. Items included box 304 are of equal precedence. In other words, reversing the order of nodes 306 and 308 generate a functionally equivalent abstract record. Below the nodes in box 304 are additional "child" logical fields that may be used to retrieve data related to the "patient" model entity.

TABLE I

QUERY EXAMPLE

```
001    <?xml version="1.0"?>
002    <!--Query string representation: (Find Patients with Glucose Test = 20)
003    <QueryAbstraction>
004        <Selection>
005            <Condition Glucose ="20">
006                <Condition field="glucose_test" operator="EQ" value="20"
007            </Condition>
009        </Selection>
010        <Results>
011                <Field name="First Name"/>
012                <Field name="Last Name"/>
013                <Field name="Glucose test"/>
014                <Field name="Test_date"/>
015        </Results>
016        <Entity name="Patient" >
017                <EntityField required="Hard" >
018                    <FieldRef name="data://Demographic/Patient ID" />
019                </EntityField>
020        </Entity>
021    </QueryAbstraction>
```

The abstract query shown in Table I includes a selection specification (lines 004-010) containing selection criteria and a results specification (lines 010-015). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. Line 16 identifies the model entity for the abstract query, in this case, a "patients" model entity. Thus, query results (e.g., result fields specified in lines 010-015) are returned for instances of a patient. Line 18 provides the identifier in the underlying In the illustrative abstract record 300, additional "child" logical fields related to the "patients" model entity include diagnosis data 310, hemoglobin test results 312, and glucose test results 314. These three terminal nodes are illustrated with a double circle representing a one-to-many relationship between the patient node and each of the test nodes. That is, each patient may have multiple diagnoses, glucose test results, and hemoglobin test results. Abstract records may be extended to an arbitrary depth depending on the facts about the model entity that are available in the underlying databases and the logical fields provided by database abstraction model 148. Each node of the abstract records indicates what logical fields are available to query for that node. Further, each of the nodes 310, 312, and 314 may map to data stored in the same table (e.g., the tests table in database $314_2$). The nodes are included separately in the abstract record to reflect that each node represents a different aspect of the model entity. In the database abstraction model 148, the "child" logical fields for this node of the abstract record may comprise a filtered field, (e.g., filtered fields $210_{3-5}$).

In one embodiment, the runtime component 114 determines whether there is a path through the abstract record 300 that leads to a node with data values that could satisfy a given condition. If not, an error result occurs, and the user may be notified that the abstract query cannot be processed. Note however, whether any actual data exists in the underlying database that satisfies the conditions specified in the abstract query is not determined from the abstract record 300. What is determined is whether the abstract record 300 contains a node corresponding to a fact about the model entity that could satisfy a condition included in an abstract query.

Figure 3B:
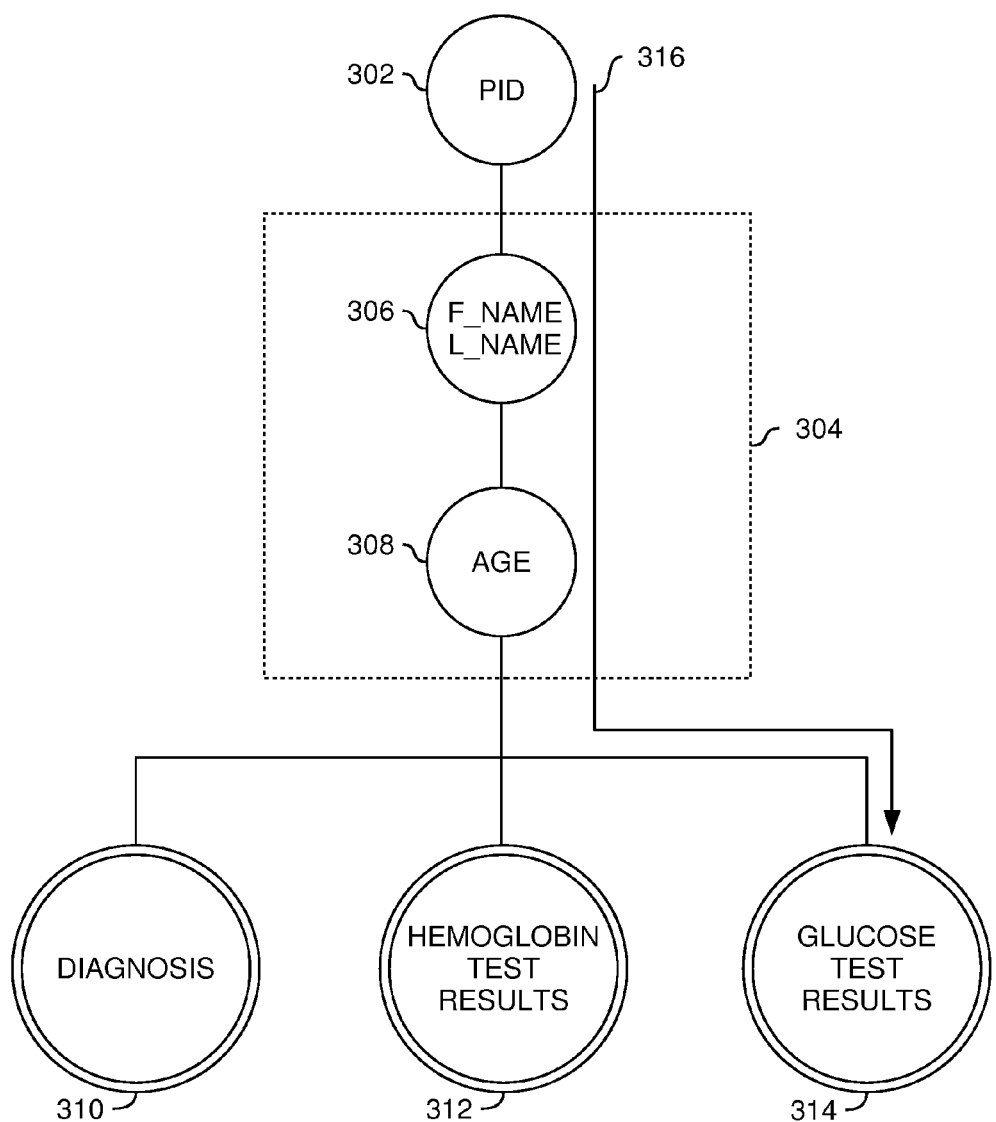

For example, FIG. 3B illustrates abstract record 300 with path 316 that leads from the root node 302 to node 314. Node 314 indicates that one fact about the "patients" model entity that may be queried is glucose test results. Further, the abstract record indicates that this data may be found in the tests table of database $214_2$. Thus, the "patients" model entity may be queried for the condition: "glucose=20." Accordingly, when the runtime component 114 processes abstract query 202, a table instance that includes the data source corresponding to the glucose test results is included in an abstract query plan generated from the abstract query plan (e.g., the tests table of database $214_2$). Table instances and abstract query plans are described in greater detail below.

Figure 3C:
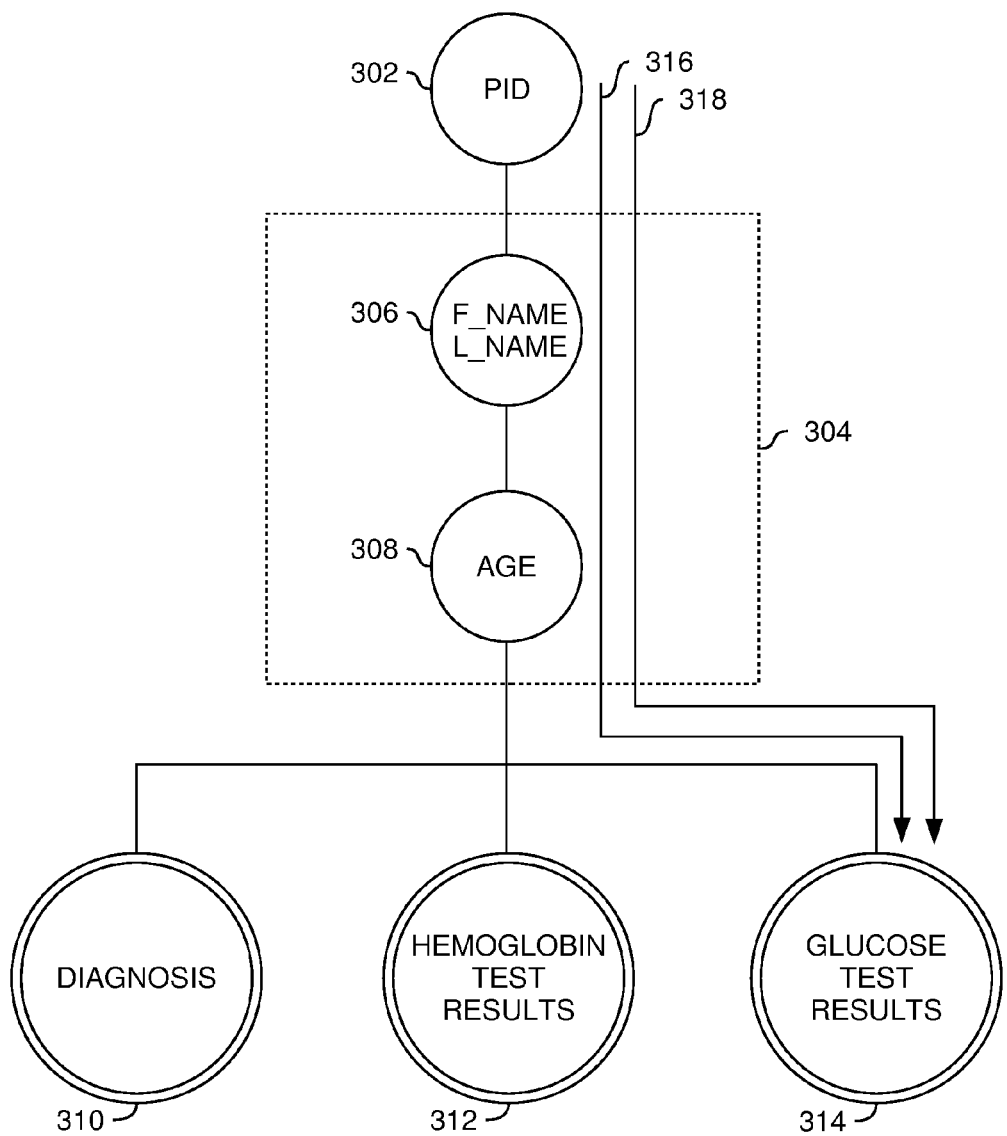

The process is repeated for other conditions included in an abstract query. For example, if abstract query 202 was modified to include an additional condition of "glucose=24", then a second table instance would be included in the abstract query plan corresponding to this second condition. FIG. 3C illustrates the abstract record 300, and two paths 316 and 318 through the abstract record each satisfying one of the two conditions for glucose test results. In other words, for each condition specified in an abstract query, there must be a path through the abstract record that could provide values used to evaluate the condition. In one embodiment, the conditions themselves may be "ANDed" together. That is, a user may specify that conditions must be simultaneously true. For example, consider the conditions "glucose<20" and "glucose>15". For multiple conditions to be simultaneously true, a single path through the abstract record must exist that satisfies all of the simultaneously true conditions.

Figure 4:
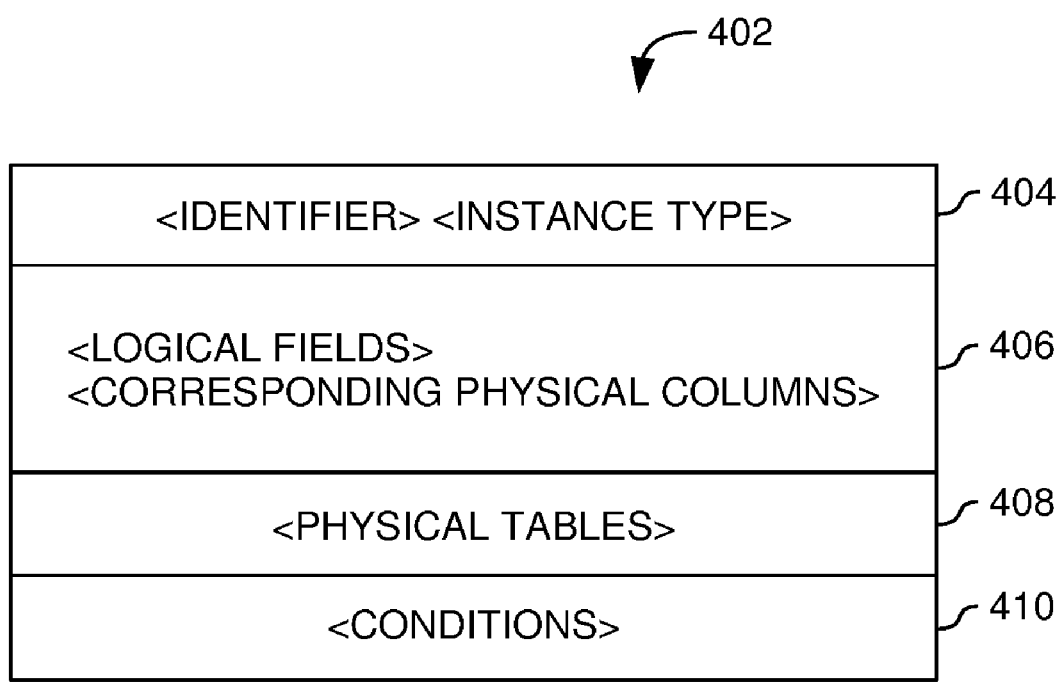
FIG. 4 illustrates one embodiment of a table instance data structure, according to one embodiment of the invention.

FIG. 4 illustrates one embodiment of a table instance 402. In one embodiment, a table instance is a data structure that indicates a data source from the underlying database, logical fields that map to the data source, and the conditions used to select data from the data source. In one embodiment, the data source is a table of a relational database. As illustrated, table instance 402 includes logical fields/columns section 406, data source section 408, and conditions sections 410. Data section 408 identifies the underlying physical data source (e.g., a relational table, view, or common table expression for a relational data source) where data for that table instance is located. Conditions section 410 includes conditions specified by the selection criteria of the abstract query that use data from the data source in section 408 to evaluate the condition.

Table instance 402 includes an identifier 404 used to identify each distinct table instance. In addition, the identifier 404 may include attributes that describe the purpose for the table in the abstract query plan. For example, attributes may classify a table instance as an informational table that is used to select data returned for an abstract query (e.g., the results criteria 204 from abstract query 202) or as a conditional table used to represent the selection critera included in the abstract query.

As described above, which table instances are necessary for a query are identified by evaluating the conditions against the abstract record associated with the model entity being queried. In other words, all of the logical data (e.g., fields and conditions) included in a particular table instance correspond to data present in the particular data source (e.g., a relational table) indicated by table section 408 for the table instance.

Figure 5A:
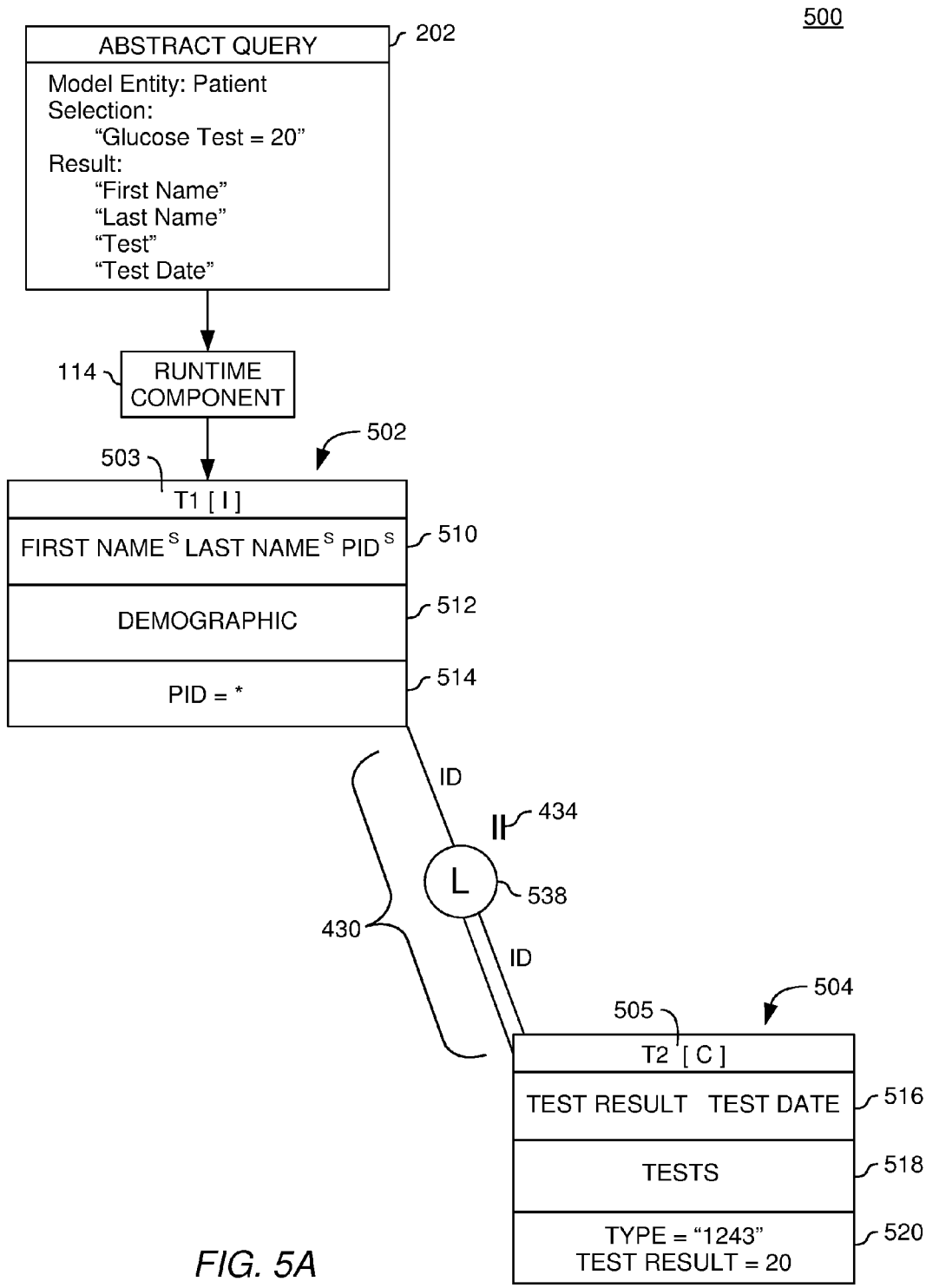
FIGS. 5A and 5B illustrate exemplary abstract query plans, according to one embodiment of the invention.

FIG. 5A illustrates an example of an abstract query plan 500 generated from abstract query 202. Using the database abstraction model 148, and query building interface 115 a user composes abstract query and submits it to the runtime component 114 for processing. In this example, the user has specified the model entity "patient" for the query. Abstract query 202 includes selection fields of "glucose=20" and the result fields "first name," "last name," "test result," and "test date."

As illustrated the abstract query plan 500 includes two table instances "t1" 502 and "t2" 504 corresponding to the tests and demographics tables of database $214_2$. Field selection data 510 includes the "first name," "last name," and "patient ID" fields. As illustrated, these fields are decorated with a superscript "s" signifying that the field is used to select data returned to a user. When implemented for execution in a computer system (e.g., server system 110), these attributes may be stored as part of the data structure used to represent a table instance. Condition section 514 includes the group of conditions used to evaluate what data is selected from data source 512.

Table instance 504 is labeled with the identifier "t2" and incorporates the selection conditions from abstract query 202 in the abstract query plan. Attribute 505 indicates that the table instance 504 is a conditional table, i.e., it corresponds to the selection criteria (i.e., conditions) included in the abstract query. In an embodiment where the abstract query plan is used to build an SQL query of a relational database, conditional tables may become part of the "where" clause for the SQL statement. Fields section 516 includes the "test result" and "test date." The data source for table instance 504 is the "tests" table. In addition, the condition section 520 includes the "type='1243'" condition that is not directly specified by the query. This condition, however, is implicitly included in the query from the "glucose test" test logical field that maps to data using a filtered field. In addition, the condition "glucose test=20" specified by the abstract query is included in this table instance and is evaluated using data retrieved from the test table.

The two table instances are joined by the join relationship 430. As illustrated, the join between the demographic table instance 502 and the tests table instance 504 is a one-to-many relationship. That is, each patient (the model entity) may have many tests. In one embodiment, relationships between tables may be specified in the data abstraction model 148 using model entity relationships that specify each table with data related to a specific model entity, and the relationships between these tables. The abstract query plan illustrated in FIG. 5A depicts this relationship using a single to double line segment for join relationship 430 representing the one-to-many aspect. In addition, the join relationship 430 includes a join type attribute 538. As illustrated, the join attribute 538 indicates a "left" join.

Those skilled in the art will recognize a "left" join as a common type of relationship between tables in a relational database, and that other join types may be "right" or "inner,"

for example, depending on the abstract query being processed. The join type indicates how to bind data together, across table instances without repeating all of the data in every table. Attribute 436 (illustrated using the Roman numeral "II") indicates to the runtime component 114 that the data is being selected from a filtered field. As illustrated, the tests table included in database $214_2$ may include test results from many types of tests, including the hemoglobin test referenced by one of the selection logical fields of abstract query 202. The filtered field "glucose test" is used to retrieve only glucose test results from this tests data source using the filtered condition 520; namely, "tests=1243."

Figure 5B:
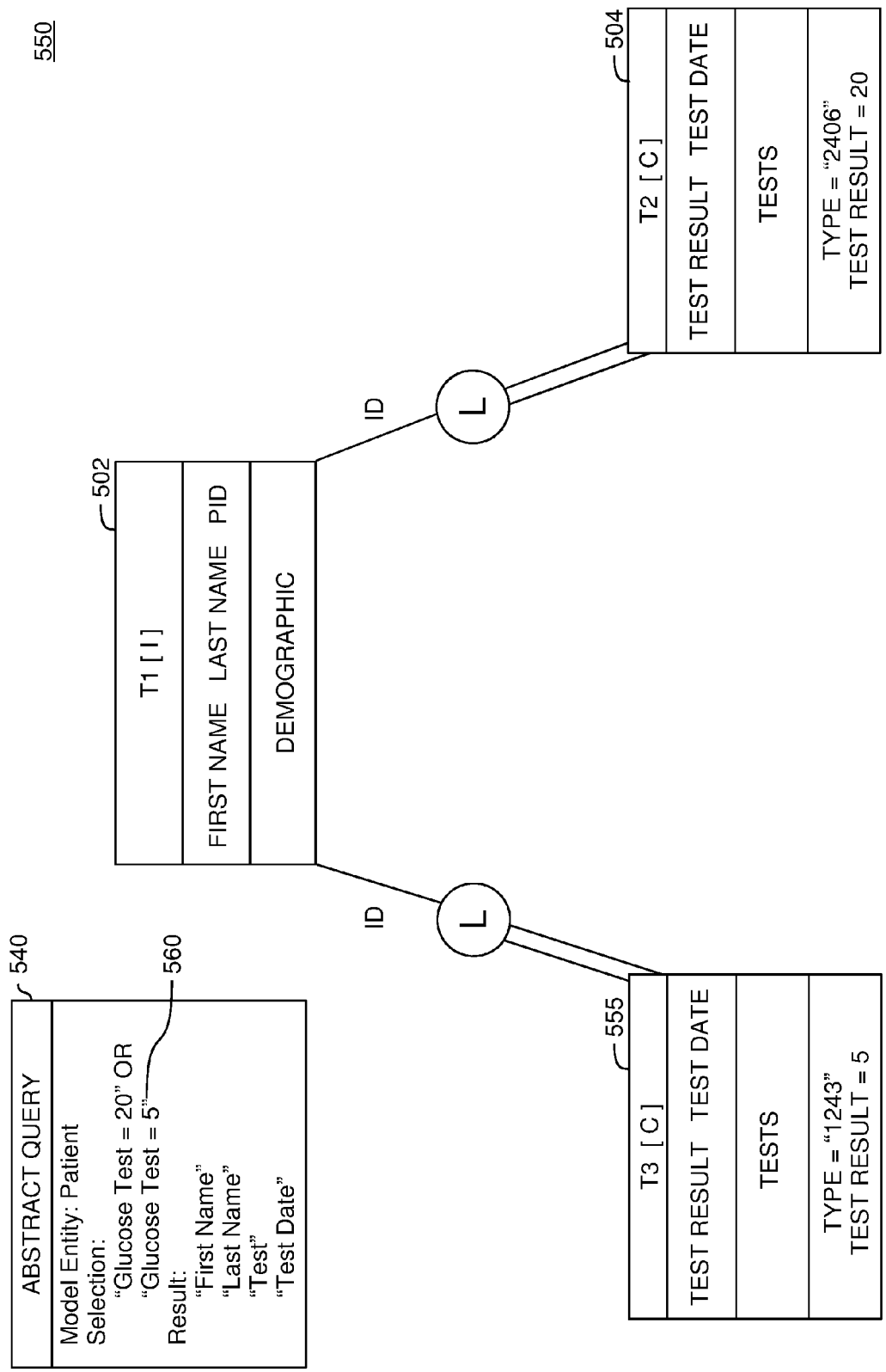

FIG. 5B illustrates an additional example of an abstract query plan 550 corresponding to abstract query 540. Abstract query 540 adds an additional condition 560 to the abstract query; namely, "glucose=5." In this second illustration, an additional copy of the tests table instance 555 is used to process the second query condition. Table instance 504, includes the condition "test=20" applied against the glucose test results. Table instance 555 specifies another condition applied against the glucose test results, i.e., "glucose=5." Abstract query plan 550 will generate a resolved query that retrieves all instances of the "patients" model entity with a glucose test result of "20" and all patients with a glucose test result of "5." Although test results are stored in the same table (e.g., tests) for both table instances (504 and 555) two table instances are included in the abstract query plan 550, one for each condition specified in abstract query 540.

Abstract Records: Query Results

Once completed, the abstract query plan may be parsed to generate a resolved query of the underlying database. In one embodiment, this may comprise generating a query that retrieves all of the data that satisfies the conditions specified by the abstract query. Additional details regarding the abstract query plan are disclosed in a commonly assigned, co-pending application "Abstract Query Plan," Ser. No. 11/005,435, filed on Dec. 6, 2004, which is incorporated herein by reference in its entirety.

When the resolved query is an SQL statement, query results may comprise a table row set. As described above, however, returning a table row set may present a user with duplicate values for the "one" side of data retrieved from a one-to-many relationship. Further, a row-set fails to reflect the hierarchy of relationships present in the data. Embodiments of the invention, therefore, present a user with query results that preserve these relationships in the query results. In one embodiment, query results are presented to a user as a set of instances of the model entity. For example, query results retrieved for abstract queries 202 and 540 may comprise instances of the "patient" model entity. The abstract record for a patient specifies what data about a patient is available through the database abstraction model 148, and illustrates the structure of data as it is related to a patient. A portion of the abstract record, corresponding to the results criteria of an abstract query, may be populated with data from the database for each instance of the model entity.

Figure 6A:
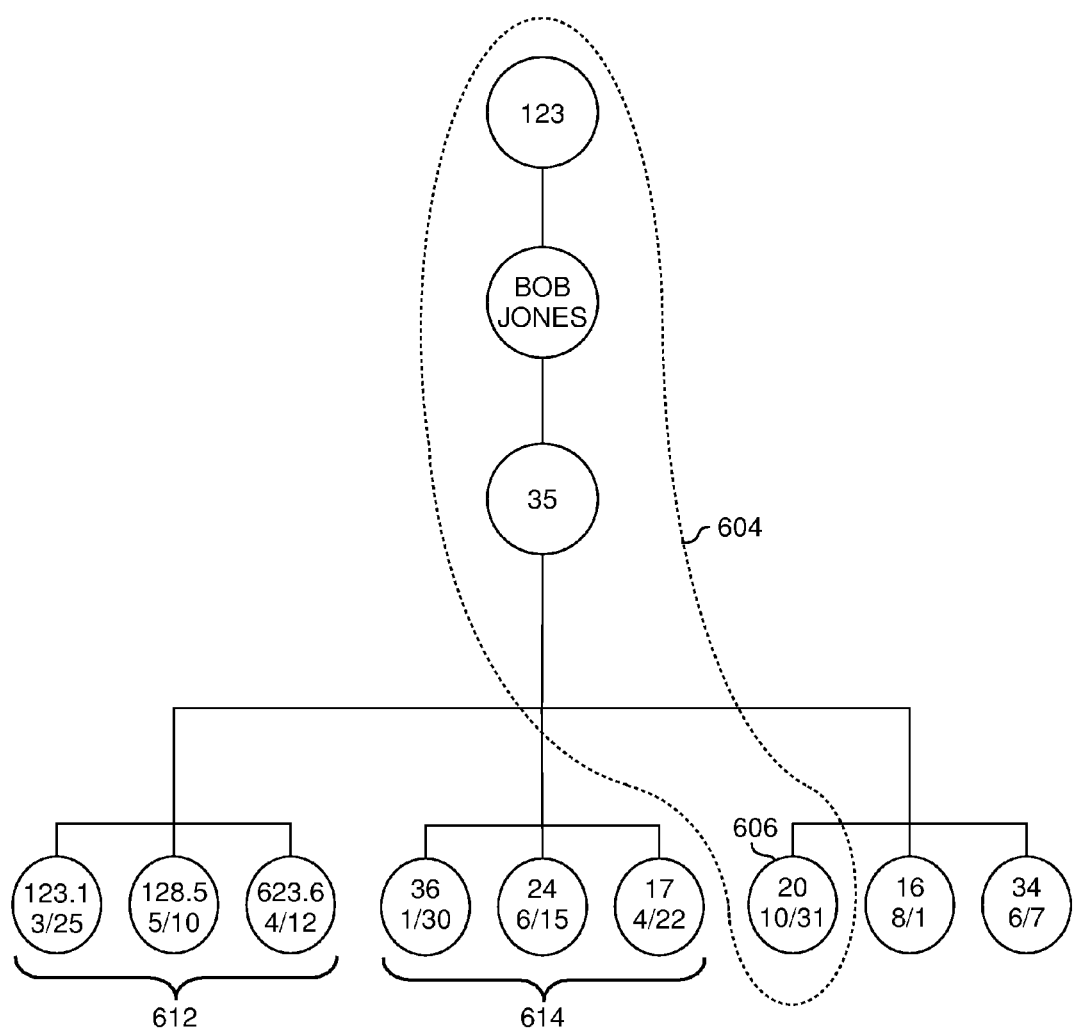
FIGS. 6A and 6B illustrate instances of an abstract record populated with data values from a database underlying the database abstraction model, according to one embodiment of the invention.
Figure 6B:
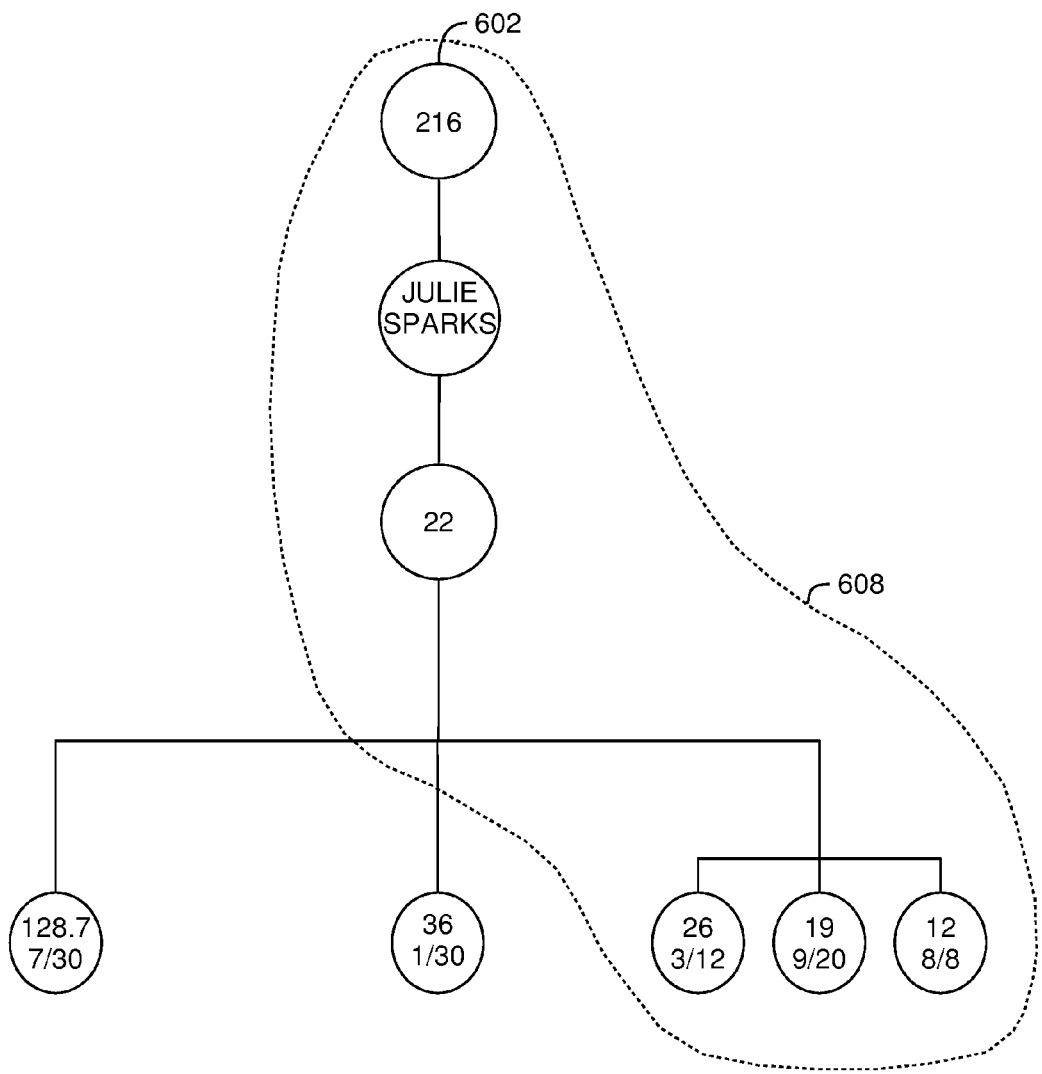

FIGS. 6A-B illustrate the abstract record for two instances of the "patients" model entity, one that satisfies the "glucose=20" condition (record 600) and one that does not (record 602). Dashed lines 604 (FIG. 6A) and 608 (FIG. 6B) indicate the portion of the abstract record retrieved for the abstract query 202. In one embodiment, the runtime component 114 may be configured to retrieve data for nodes of the abstract record that correspond with the logical fields specified by results section of the abstract query. Thus, data for the entire abstract record may not be retrieved. For example, using abstract query 202, data for some nodes (e.g., diagnoses values 612 and hemoglobin test results 614) is not needed, and accordingly, is not retrieved. Once abstract records are populated with the appropriate data values, the runtime component 114 may present the user with the set of instances of the model entity. Data for each model entity is retrieved from the database and may be stored in an abstract record (e.g., record 600).

In one embodiment, a user selects a model entity from a display that indicates what model entities have been defined for the database abstraction model 148. In such a case, a user may simply make a selection from a list of model entities, and the runtime component 114 retrieves the instances of the selected model entity that occur in the underlying database. For example, using the "patient" model entity, a list of patient IDs (or names) may be displayed allowing a doctor to select a specific model entity. The abstract record for the model entity may be populated with data for each instance, and a user may browse through the hierarchy using interface 115.

Alternatively, a user may be presented with a customized query application used to interrogate the database abstraction model 148 for data related to a specific model entity. For example, using the same underlying physical database, a query interface 115 may be used to present doctors with an interface to patient data. Thus, the interface 115 would allow a doctor to compose and issue queries about the patient model entity. Only the data in the underlying database "visible" through the "patients" model entity and corresponding abstract record would be available to query through the interface 115. Another interface 115 might be provided to a staff review board to query a "doctors" model entity. Yet another interface 115 may be provided to query the "employee" model entity for a human resources department.

In any case, what data is available for each model entity is identified by an abstract record. Once instances of the model entity are selected, the abstract record may be used to store data for each instance. FIG. 700 illustrates an exemplary graphical display of query results comprising a set of abstract record instances. The instances may be displayed using application 120 or web-browser 122 to a user interacting with query interface 115. The abstract query section 702 is illustrated with abstract query 202 and results section 704. The results are displayed as a set of abstract records. Each instance of the "patients" abstract record returned for the query 202 is illustrated in box 706, and the currently selected abstract record is displayed in display area 706.

Query Processing: Operational Methods

Figure 8:
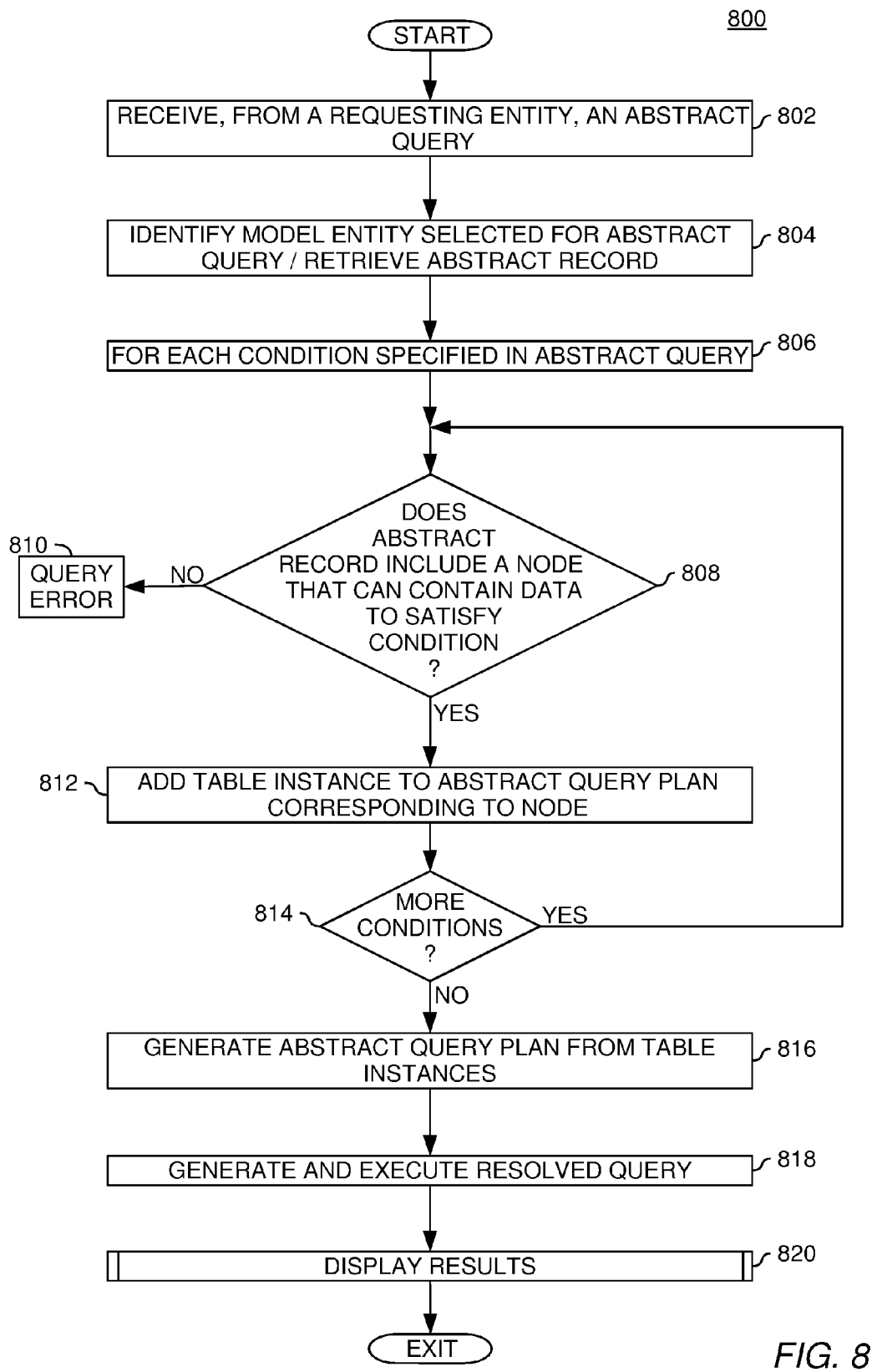
FIG. 8 illustrates a method for query processing, according to one embodiment of the invention.

FIG. 8 illustrates a method 800 for determining which data sources (e.g., relational tables) will be needed to construct an abstract query plan from a given abstract query. The method 800 begins at step 802 when the runtime component 114 receives, from a requesting entity, an abstract query. Next, at step 804, the model entity selected for the abstract query received in step 802 is identified by inspecting the abstract query. Also at step 804, the abstract record template (e.g., the abstract record illustrated in FIG. 3A) corresponding to the model entity is retrieved from the database abstraction model 148.

A loop process begins at step 806 that repeats for each condition specified in the abstract query received at step 802. At step 808, the runtime component 114 determines whether the abstract record includes a node corresponding to a data source that can be used to evaluate the condition. If so, at step 812, the table is added to a set of table instances later used to construct an abstract query plan (step 816). Otherwise, the abstract record corresponding to the selected model entity does not specify a logical field included in the condition. For example, if a user selected a "patients" model entity and tried to include a query condition for an "employee performance review" logical field, an error condition results. Although the database may include data related to employees, the abstract record for a patient does not. An "employee" model entity, however, would likely include such a logical field. In one embodiment, error conditions like this may be prevented by configuring the query building interface 115 to present users with only the logical fields that are included in the abstract record for a selected model entity.

At decision step 814, the method determines whether there are additional conditions in the abstract query that need to be evaluated. Steps 808-814 repeat for each condition included in the abstract query. After a data source has been identified for each condition, the set of table instances is used to generate an abstract query plan at step 816. Next, the abstract query plan is used to generate a resolved query (e.g., an SQL statement) executed against an underlying physical database. Finally, at step 820, the resolved query is executed against the underlying database system to retrieve a set of query results returned to the requesting entity.

Figure 9:
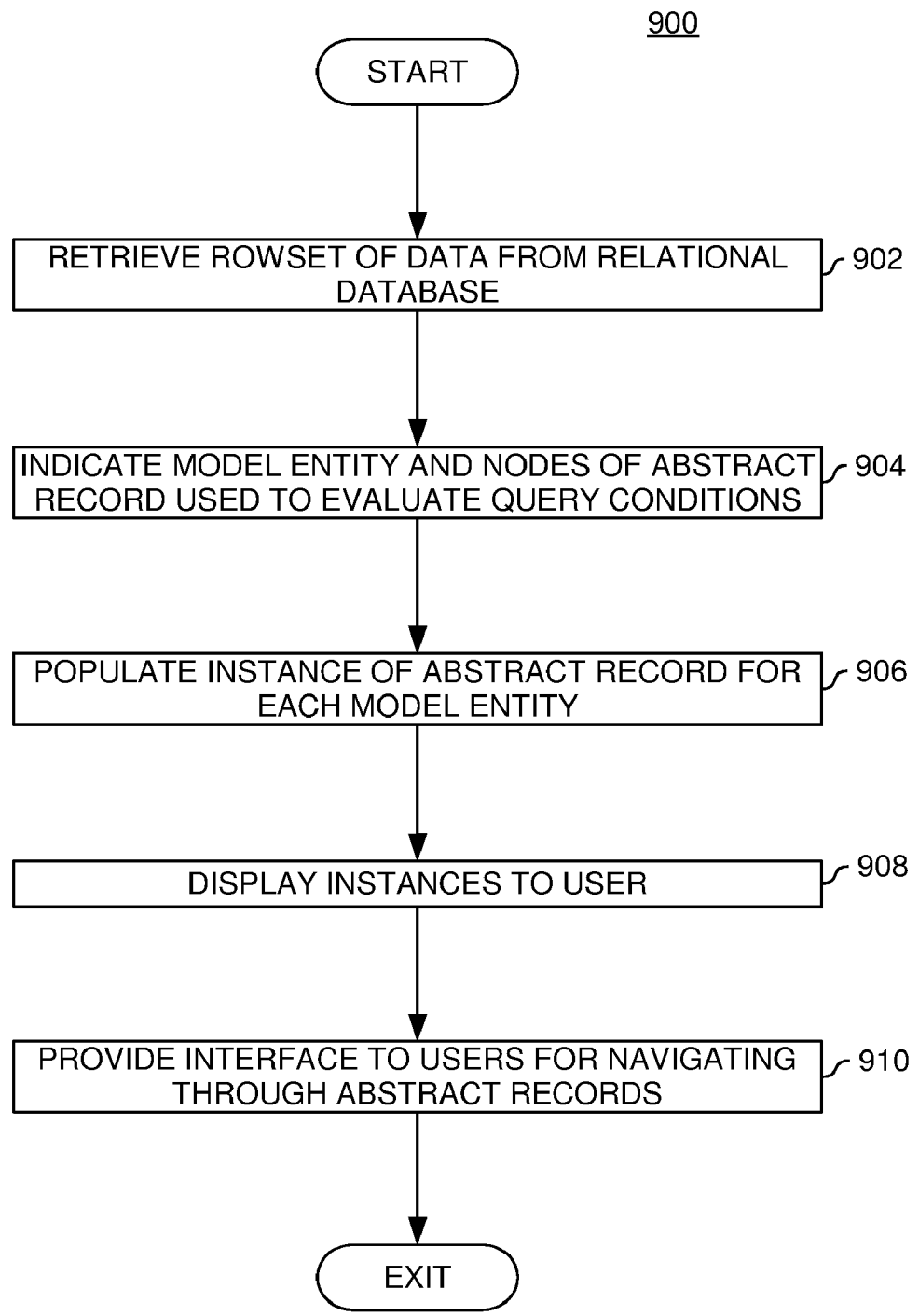
FIG. 9 illustrates a method for presenting query results to a user, according to one embodiment of the invention.

In one embodiment, the query results are returned in the format provided by the underlying database, such as a table row set returned for an SQL query. Alternatively, FIG. 9 illustrates a method 900 for presenting instances of the abstract record to a user, according to one embodiment of the invention. The method 900 begins at step 902, (corresponding to step 818 of operations 800) where the resolved query is used to retrieve a set of query results. At step 904, the data from the row set of query results are mapped back into the nodes of the abstract record. For each instance of a model entity retrieved in the query results that satisfy the query conditions specified in the abstract query, an instance of the abstract record is populated with the data retrieved using the resolved query.

At step 908, the query results are presented to the user. For example, the exemplary graphical interface screen 700 illustrated in FIG. 7 may be displayed on application 120 or web browser 122. At step 910, in addition to the actual instances of the model entity presented to a user, an interface for navigating through the hierarchy of the abstract record for each instance is provided. For example, screen 700 includes an abstract query section displaying abstract query 202. The column on the left side of the screen displays instances of the "patients" model entity returned for the query 202. Query interface 115 allows a user to select a particular model entity to display in detail. In one embodiment, the detail displayed corresponds to the logical fields specified by the query as part of the results criteria.

Abstract Records: Never Exist Conditions

In a particular embodiment, abstract records are used to evaluate a particular kind of condition specified for an abstract query, namely, "never exist" conditions. "Never exist" conditions involve a query that retrieves abstract records that do not have a specified condition or value. Consider the application of a never exist condition to abstract query 202. For example, a "never exist" condition could be specified for the "glucose=20" condition from abstract query 202. Once abstract records are populated for instances of the model entity (e.g., as part of step 906 illustrated in FIG. 9), the never exist condition may be evaluated. Applying a "never exists" condition to the "glucose=20" condition will return patients with no glucose test value equal to twenty. Note however, this is different than simple negation. Negating the condition (e.g. ("glucose !=20") would return test results for any test that did not equal twenty. In contrast, a "never exists" condition returns an instance of the model entity only if no value satisfies the condition, across all values, for the instance. For example, query results from applying the "never exists" condition to the "glucose=20" selection criteria would include the abstract record illustrated in 6B, because none of the glucose values equals twenty for any one of the three test results illustrated. However, query results would not include the abstract record illustrated in FIG. 6A, because one of the test results does equal 20. In one embodiment, the interface 115 may present a graphical user interface control to apply a "never exists" condition to the query selection criteria.

CONCLUSION

Abstract records extend the functionality of a database abstraction model. First, abstract records are used both as part of query processing to identify which copies of a data source (e.g., tables) are needed to construct an abstract query plan. When multiple conditions are applied against the same underlying data source, abstract records are used to determine how many copies of a particular table will be needed during query processing. Second, abstract records may be used to present a more intuitive view of data retrieved in response to a query. That is, the abstraction created by the database abstraction model does not end with query results presented as a row set from an SQL query. Instead, in response to a question about a model entity, a set of abstract records that answer the questions posed by the user are returned. Additionally, abstract records provide a useful method for determining "never exists" conditions.

While the foregoing is directed to embodiments of the present invention, other and further embodiments of the invention may be devised without departing from the basic scope thereof, and the scope thereof is determined by the claims that follow.

What is claimed is:

1. A method of presenting a user with a set of query results retrieved from a database, comprising:
  receiving, from a requesting entity, a request to view data in the database related to a model entity predefined as a set of logically related data fields, wherein the model entity identifies an identifier in the underlying database used to identify instances of the model entity;
  retrieving an abstract record corresponding to the model entity, wherein the abstract record identifies a hierarchy of logical fields related to the model entity;
  identifying each instance of the model entity included in the query results;
  for each identified instance, populating a copy of the abstract record with the retrieved query results corresponding to the instance of the model entity; and
  returning, to the requesting entity, the identified instances of the model entity and the populated copies of the abstract record;
  wherein the query results are retrieved responsive to an abstract query and via an abstract query plan provided for the abstract query, wherein the abstract query plan specifies: (i) a set of conditions, each condition including a logical field, a conditional operator, and a comparison value, (ii) one of the plurality of model entities and (iii) logical fields from the plurality of logical fields used to retrieve a set of query results that satisfy the set of conditions; and wherein providing the abstract query plan comprises:
  determining, for each condition specified by the abstract query, whether a path exists from a root logical field of the hierarchy to a child logical field of the hierarchy matching the logical field in the condition.

2. The method of claim 1, wherein the query results are retrieved responsive to an abstract query specifying a set of conditions, wherein at least one of the conditions comprises a "never exists" condition used to retrieve, from the database, instances of the model entity that do not include the data value specified by the "never exists" condition.

3. The method of claim 1, wherein the model entity is defined by a database abstraction model configured to specify a plurality of logical fields, each logical field providing an access method that maps the logical field to data associated with the respective logical field, and wherein the hierarchy of logical fields is selected from the plurality of logical fields.

4. The method of claim 1, wherein the model entity is uniquely identifiable by an associated model entity name.

5. The method of claim 1, wherein providing the abstract query plan further comprises:
for each path determined to exist, associating a table of the underlying database that is mapped to by the child logical field with a table instance, each table instance including those logical fields from the abstract query that map to the table, wherein those conditions from the set of conditions are to be evaluated using data from the table.

6. The method of claim 5, wherein providing the abstract query plan further comprises:
generating the abstract query plan for the abstract query, wherein the abstract query plan includes the table instances and identifies relationships between the table instances.

7. The method of claim 6, wherein the abstract query plan is parseable to generate a resolved query of the database, and wherein the resolved query is executable to retrieve the set of query results.

8. The method of claim 7, wherein the method further comprises:
providing a query interface configured to display a selected instance of the model entity, wherein the query interface is further configured to display the copy of the abstract record for the selected instance.

9. The method of claim 8, wherein the query interface is configured to display only a portion of the abstract record that includes logical fields from the hierarchy that were included in the abstract query as the plurality of logical fields used to retrieve the set of query results.

10. The method of claim 7, wherein the database comprises a relational database, and wherein the resolved query comprises a Structured Query Language (SQL) query statement.

11. A computer-readable storage medium containing a plurality of instructions which, when executed on a computer system, is configured to perform an operation for presenting a user with a set of query results retrieved from a relational database, the operation comprising:
receiving, from a requesting entity, a request to view data in the database related to a model entity predefined as a set of logically related data fields, wherein the model entity identifies an identifier in the underlying database used to identify instances of the model entity;
retrieving an abstract record corresponding to the model entity, wherein the abstract record identifies a hierarchy of logical fields related to the model entity;
identifying each instance of the model entity included in the query results;
for each identified instance, populating a copy of the abstract record with the retrieved query results corresponding to the instance of the model entity; and
returning, to the requesting entity, the identified instances and the populated copies of the abstract record;
wherein the model entity is defined by a database abstraction model configured to specify a plurality of logical fields, each logical field providing an access method that maps the logical field to data associated with the respective logical field, wherein the hierarchy of logical fields is selected from the plurality of logical fields, wherein the query results are retrieved responsive to an abstract query and via an abstract query plan provided for the abstract query, wherein the abstract query specifies a set of conditions, each condition including a logical field, and wherein the abstract query plan is configured to determine, for each condition specified by the abstract query, whether a path exists from a root logical field of the hierarchy to a child logical field of the hierarchy matching the logical field in the condition.

12. The computer-readable storage medium of claim 11, wherein the query results are retrieved responsive to an abstract query specifying a set of conditions, wherein at least one of the conditions comprises a "never exists" condition used to retrieve, from the database, instances of the model entity that do not include the data value specified by the "never exists" condition.

13. A system, comprising:
one or more computer processors;
a memory containing a program which, when executed by the one or more computer processors, is configured to perform an operation for presenting a user with a set of query results retrieved from a database, wherein the operation comprises:
receiving, from a requesting entity, a request to view data in the database related to a model entity predefined as a set of logically related data fields, wherein the model entity identifies an identifier in the underlying database used to identify instances of the model entity;
retrieving an abstract record corresponding to the model entity, wherein the abstract record identifies a hierarchy of logical fields related to the model entity;
identifying each instance of the model entity included in the query results;
for each identified instance, populating a copy of the abstract record with the retrieved query results corresponding to the instance of the model entity; and
returning, to the requesting entity, the identified instances of the model entity and the populated copies of the abstract record;
wherein the model entity is defined by a database abstraction model configured to specify a plurality of logical fields, each logical field providing an access method that maps the logical field to data associated with the respective logical field, wherein the hierarchy of logical fields is selected from the plurality of logical fields, wherein the query results are retrieved responsive to an abstract query and via an abstract query plan provided for the abstract query, wherein the abstract query specifies a set of conditions, each condition including a logical field, and wherein the abstract query plan is configured to determine, for each condition specified by the abstract query, whether a path exists from a root logical field of the hierarchy to a child logical field of the hierarchy matching the logical field in the condition.

14. The system of claim 13, wherein the query results are retrieved responsive to an abstract query specifying a set of conditions, wherein at least one of the conditions comprises a "never exists" condition used to retrieve, from the database, instances of the model entity that do not include the data value specified by the "never exists" condition.

15. A method of presenting a user with a set of query results retrieved from a database, comprising:

receiving, from a requesting entity, a request to view data in the database related to a model entity predefined as a set of logically related data fields, wherein the model entity identifies an identifier in the underlying database used to identify instances of the model entity;

retrieving an abstract record corresponding to the model entity, wherein the abstract record identifies a hierarchy of logical fields related to the model entity;

identifying each instance of the model entity included in the query results;

for each identified instance, populating a copy of the abstract record with the retrieved query results corresponding to the instance of the model entity; and returning, to the requesting entity, the identified instances of the model entity and the populated copies of the abstract record;

wherein the model entity is defined by a database abstraction model configured to specify a plurality of logical fields, each logical field providing an access method that maps the logical field to data associated with the respective logical field, wherein the hierarchy of logical fields is selected from the plurality of logical fields, wherein the query results are retrieved responsive to an abstract query and via an abstract query plan provided for the abstract query, wherein the abstract query specifies a set of conditions, each condition including a logical field, and wherein the abstract query plan is configured to determine, for each condition specified by the abstract query, whether a path exists from a root logical field of the hierarchy to a child logical field of the hierarchy matching the logical field in the condition.

* * * * *